US012532246B2

(12) United States Patent
Torgerson et al.

(10) Patent No.: US 12,532,246 B2
(45) Date of Patent: Jan. 20, 2026

(54) ENERGY CONSUMPTION REDUCTION FOR MEDICAL DEVICE CONNECTIVITY

(71) Applicant: Medtronic, Inc., Minneapolis, MN (US)

(72) Inventors: Nathan A. Torgerson, Andover, MN (US); Ashutosh Mehra, St. Paul, MN (US); Brent P. Johnson, Shoreview, MN (US); Joel A. Anderson, Brooklyn Park, MN (US); Venkat R. Gaddam, Plymouth, MN (US); Arthur K. Lai, Minnetonka, MN (US); Trevor D. Webster, Minneapolis, MN (US); Bernard P. Bechara, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 431 days.

(21) Appl. No.: 18/069,346

(22) Filed: Dec. 21, 2022

(65) Prior Publication Data
US 2023/0209444 A1 Jun. 29, 2023

Related U.S. Application Data

(60) Provisional application No. 63/364,007, filed on May 2, 2022, provisional application No. 63/265,977, filed on Dec. 23, 2021.

(51) Int. Cl.
*H04W 52/02* (2009.01)
*A61N 1/05* (2006.01)
(Continued)

(52) U.S. Cl.
CPC .......... *H04W 48/10* (2013.01); *A61N 1/0534* (2013.01); *A61N 1/0551* (2013.01); *H04W 52/0229* (2013.01); *H04W 76/10* (2018.02)

(58) Field of Classification Search
CPC ... H04W 4/80; H04W 76/10; H04W 52/0229; H04W 52/02; A61N 1/0534; A61N 1/0551
See application file for complete search history.

(56) References Cited

U.S. PATENT DOCUMENTS 9,288,614 B1 3/2016 Young et al.
9,445,264 B2 9/2016 Young et al.
(Continued)

FOREIGN PATENT DOCUMENTS

WO 2012057872 A1 5/2012

OTHER PUBLICATIONS

Communication pursuant to Article 94(3) EPC from counterpart European Application No. 22214685.4 dated May 3, 2024, 5 pp.
(Continued)

Primary Examiner — Tuan H Nguyen
(74) Attorney, Agent, or Firm — Shumaker & Sieffert, P.A.

(57) ABSTRACT

In one example, a system includes telemetry circuitry configured for communication between a medical device and an external device associated with the medical device and processing circuitry. The processing circuitry is configured to determine an advertising interval for communication between the external device and the medical device based on sensor information from the external device. The processing circuitry is further configured to configure the medical device to advertise at the determined advertising interval.

20 Claims, 20 Drawing Sheets

(51) Int. Cl.
    *H04W 48/10*  (2009.01)
    *H04W 76/10*  (2018.01)

(56)        References Cited

U.S. PATENT DOCUMENTS 9,907,486   B2      3/2018   Pflugh et al.
   10,182,336   B1      1/2019   Stockton et al.
   10,517,048   B2     12/2019   Ramappa et al.
   11,516,860   B2 *   11/2022   Wu ..................... A61N 1/3956
 2009/0138058   A1      5/2009   Cooke et al.
 2010/0211123   A1      8/2010   Stubbs et al.
 2011/0106204   A1      5/2011   Yoon et al.
 2011/0137359   A1      6/2011   Stubbs et al.
 2015/0209589   A1      7/2015   Jenison et al.
 2017/0312530   A1 *   11/2017   Schilling ............ A61N 1/37223
 2018/0049251   A1      2/2018   Hellman et al.
 2020/0129773   A1      4/2020   Eisele et al.

OTHER PUBLICATIONS

Extended Search Report from counterpart European Application No. 22214685.4 dated May 11, 2023, 8 pp.
Response to Extended Search Report dated May 11, 2023, from counterpart European Application No. 22214685.4 filed Dec. 15, 2023, 36 pp.
Notice of Allowance from U.S. Appl. No. 18/069,606 dated Jun. 27, 2025, 9 pp.

* cited by examiner

ENERGY CONSUMPTION REDUCTION FOR MEDICAL DEVICE CONNECTIVITY

This application claims the benefit of U.S. Provisional Patent Application No. 63/364,007, filed 2 May 2022, and claims the benefit of U.S. Provisional Patent Application No. 63/265,977, filed 23 Dec. 2021, the entire content of each application is incorporated herein by reference.

TECHNICAL FIELD

This disclosure generally relates to electrical stimulation therapy.

BACKGROUND

Medical devices may be external or implanted, and may be used to sense neural signals (e.g., central and peripheral nerves) and/or deliver electrical stimulation therapy to various tissue sites of a patient to treat a variety of symptoms or conditions such as, for example, one or more of chronic pain, tremor, Parkinson's disease, other movement disorders, epilepsy, urinary or fecal incontinence, sexual dysfunction, obesity, gastroparesis, sleep apnea, neural control of prosthetic devices, or stimulation to provide peripheral sensation. A medical device delivers electrical stimulation therapy via one or more leads that include electrodes located proximate to target locations associated with the brain, the spinal cord, pelvic nerves, peripheral nerves, or the gastrointestinal tract of a patient. For bipolar stimulation, the electrodes used for stimulation may be on one or more leads. For unipolar stimulation, the electrodes may include one or more leads and an electrode on a stimulator housing located remotely from the target site (e.g., near clavicle). It may be possible to use leadless stimulation using electrodes mounted on the stimulator housing. Hence, electrical stimulation is used in different therapeutic applications, such as deep brain stimulation (DBS), spinal cord stimulation (SCS), pelvic stimulation, gastric stimulation, or peripheral nerve field stimulation (PNFS).

A clinician may select values for a number of programmable parameters in order to define the electrical stimulation therapy to be delivered by the implantable stimulator to a patient. For example, the clinician may select one or more electrodes for delivery of the stimulation, a polarity of each selected electrode, a voltage or current pulse amplitude, a pulse width, and a pulse rate as stimulation parameters. A set of parameters, such as a set including electrode combination, electrode polarity, amplitude, pulse width, and pulse rate, may be referred to as a program in the sense that they define the electrical stimulation therapy to be delivered to the patient.

SUMMARY

This disclosure describes example techniques for using information from an external device associated with a medical device (e.g., an implantable medical device) to improve responsiveness of communication between the external and implanted medical device while minimizing energy drain of either the implant, the external device, or both. In this example, a system may determine an advertising interval for communication between the external device and the medical device based on the movement of the external device. For instance, the system may determine to reduce the advertising interval from a current advertising interval in response to an increase in, or initiation of, the movement of the external device and increase the advertising interval from the current advertising interval in response to a decrease in, or cessation of, the movement of the external device. In this example, the system may configure the medical device and/or the external device to communicate using the determined advertising interval.

While the above example uses a movement of the external device as sensor information, the system may determine the advertising interval using sensor information that is based on, for example, one or more of the movement of the external device, a detected light level, a detected sound level, or other sensor information. In this way, the system may help to reduce a time to initiate communication between the medical device and the external device when the user (e.g., a patient, caretaker, or clinician) is likely to request communication. For example, by reducing the advertising interval, the system may reduce or avoid latency in establishing the connection to help to improve the response time and usability of the system. Conversely, by increasing the advertising interval, the system may also potentially reduce the communication energy drain when the communication is not likely to be needed (e.g., when the user is sleeping or not otherwise interacting with the external device).

In some examples, a system may determine to preemptively initiate a communication session for communication between the external device and the medical device based on sensor information from the external device. A communication session may refer to data transmissions between an external device and medical device once connection with a host is established after the advertisement. While examples may refer to a Bluetooth™ session, examples may use other communication sessions. For instance, the system may determine to initiate the communication session in response to an increase in a movement of the external device. In some examples, the system may determine to initiate the communication session in response to the increase in the movement of the external device and further in response to a determination that the movement has been less than a threshold for a predetermined period of time. While the external device initiates communication in the above example, in some examples, the medical device may initiate communication between external device and medical device, for example, based on a voice command from the user (e.g., the patient or a caretaker) directly to the medical device which is not using sensor information from external device.

In accordance with the techniques of the disclosure, a system may enable smart connection parameters for communications using an adaptive learning algorithm with inputs like historic daily connection times, sensor information (e.g., generated by a sensor in the medical device and/or in the external device), direct user input, type of other connections, geographical location, application access, etc. In this way, the system may implement smart connectivity driving optimized longevity of a battery of the medical device (e.g., an implantable medical device) and an optimized individual tailor-made user experience that reduces or even eliminates a connection latency. This algorithm can also be assisted with inductive downlinks over an inductive telemetry to the implant making the advertising rate temporarily fast to enable faster communications. Techniques described herein may help to allow the medical device to function to optimum performance levels exceling in patient experience while improving device longevity. Techniques described herein may help to allow patients to use an implantable medical device for a longer time, therefore reducing the risk of replacement surgeries.

In one example, this disclosure describes a system comprising telemetry circuitry configured for communication between a medical device and an external device associated with the medical device and processing circuitry. The processing circuitry is configured to determine an advertising interval for communication between the external device and the medical device based on sensor information from the external device. The processing circuitry is further configured to configure the medical device to advertise at the determined advertising interval.

In another example, this disclosure describes a method comprising determining, with processing circuitry, an advertising interval for communication between the external device and the medical device based on sensor information from the external device. The method further comprises configuring, with the processing circuitry, the medical device to advertise at the determined advertising interval.

In one example, this disclosure describes a computer-readable storage medium having stored thereon instructions that, when executed, cause processing circuitry to determine an advertising interval for communication between an external device and a medical device associated with the external device based on sensor information from the external device and configure the medical device to advertise at the determined advertising interval.

In another example, this disclosure describes a system comprising telemetry circuitry configured for communication between a medical device and an external device associated with the medical device and processing circuitry. The processing circuitry is configured to determine to initiate a communication session with the medical device based on sensor information from the external device. The processing circuitry is further configured to establish, with the telemetry circuitry, the communication session with the medical device in response to the determination to initiate the communication session with the medical device and receive, after establishing the communication session, an instruction to configure the medical device with at least one program parameter. The processing circuitry is further configured to output, using the communication session, information to cause the medical device to provide therapy using the at least one program parameter.

In one example, this disclosure describes a method comprising determining, with processing circuitry, to initiate a communication session with the medical device based on sensor information from the external device. The method further comprises establishing, with the processing circuitry, the communication session with the medical device in response to the determination to initiate the communication session with the medical device and receiving, with the processing circuitry, after establishing the communication session, an instruction to configure the medical device with at least one program parameter. The method further comprises outputting, with the processing circuitry, using the communication session, information to cause the medical device to provide therapy using the at least one program parameter.

In another example, this disclosure describes a computer-readable storage medium having stored thereon instructions that, when executed, cause processing circuitry to determine to initiate a communication session with a medical device based on sensor information from an external device associated with the medical device. The instructions further cause the processing circuitry to establish the communication session with the medical device in response to the determination to initiate the communication session with the medical device and receive, after establishing the communication session, an instruction to configure the medical device with at least one program parameter. The instructions further cause the processing circuitry to output, using the communication session, information to cause the medical device to provide therapy using the at least one program parameter.

In one example, this disclosure describes a system comprising telemetry circuitry configured for communication between a medical device and an external device associated with the medical device and processing circuitry. The processing circuitry is configured to determine an advertising interval between the external device and the medical device based on the sensor information from the external device and configure the medical device to advertise at the determined interval.

In another example, this disclosure describes a method comprising determining, with processing circuitry, an advertising interval for communication between an external device and a medical device associated with the external device based on sensor information from the external device and configuring, with the processing circuitry, the medical device to advertise at the determined advertising interval.

In one example, this disclosure describes a computer-readable storage medium having stored thereon instructions that, when executed, cause processing circuitry to determine an advertising interval for communication between an external device and a medical device associated with the external device based on sensor information from the external device and configure the medical device to advertise at the determined advertising interval.

In another example, this disclosure describes a system comprising telemetry circuitry configured for communication between a medical device and an external device associated with the medical device and processing circuitry. The processing circuitry is configured to determine to initiate a communication session with the medical device based on sensor information from the external device, establish, with the telemetry circuitry, the communication session with the medical device in response to the determination to initiate the communication session with the medical device, receive, after establishing the communication session, an instruction to configure the medical device with at least one program parameter, and output, using the communication session, information to cause the medical device to provide therapy using the at least one program parameter.

In one example, this disclosure describes a method comprising determining, with processing circuitry, to initiate a communication session with a medical device based on sensor information from an external device associated with the medical device, establishing, with the processing circuitry, the communication session with the medical device in response to the determination to initiate the communication session with the medical device, receiving, with the processing circuitry, after establishing the communication session, an instruction to configure the medical device with at least one program parameter, and outputting, with the processing circuitry, using the communication session, information to cause the medical device to provide therapy using the at least one program parameter.

In another example, this disclosure describes a computer-readable storage medium having stored thereon instructions that, when executed, cause processing circuitry to determine to initiate a communication session with a medical device based on sensor information from an external device associated with the medical device, establish the communication session with the medical device in response to the determination to initiate the communication session with the medical device, receive, after establishing the communication session, an instruction to configure the medical device with at least one program parameter, and output, using the communication session, information to cause the medical device to provide therapy using the at least one program parameter.

In one example, this disclosure describes a system comprising telemetry circuitry configured for communication between a medical device and an external device associated with the medical device and processing circuitry. The processing circuitry is configured to determine connection parameters for a connection between the medical device and the external device based on one or more of first information detected by the external device or second information detected by the medical device, output an advertisement for the connection between the medical device and the external device based on the connection parameters, establish the connection between the medical device and the external device according to advertisement, receive, using the connection between the medical device and the external device, at least one program parameter from the external device, and deliver therapy to patient associated with medical device using the at least one program parameter.

In another example, this disclosure describes a system comprising telemetry circuitry configured for communication between a medical device and an external device associated with the medical device and processing circuitry. The processing circuitry is configured to determine a target connection time for a connection between the medical device and the external device based on one or more of first information detected by the external device or second information detected by the medical device, establish, with the telemetry circuitry and at the target connection time, the connection between the medical device and the external device, and cause, using the connection, the medical device to deliver therapy to a patient associated with the medical device.

In one example, this disclosure describes a system comprising telemetry circuitry configured for communication between a medical device and an external device associated with the medical device and processing circuitry. The processing circuitry is configured to output an advertisement for a connection between the medical device and the external device using first connection parameters, determine a sting has occurred, in response to the determination that the out-of-band sting has occurred, output the advertisement using second connection parameters associated with the sting, and establish the connection between the medical device and the external device according to the advertisement output using second connection parameters.

In another example, this disclosure describes a system comprising telemetry circuitry configured for communication between a medical device and an external device associated with the medical device and processing circuitry. The processing circuitry is configured to determine a target connection time for a connection between the medical device and the external device based on first connection parameters, determine a sting has occurred, and in response to the determination that the sting has occurred and before the target connection time, establish the connection between the medical device and the external device.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
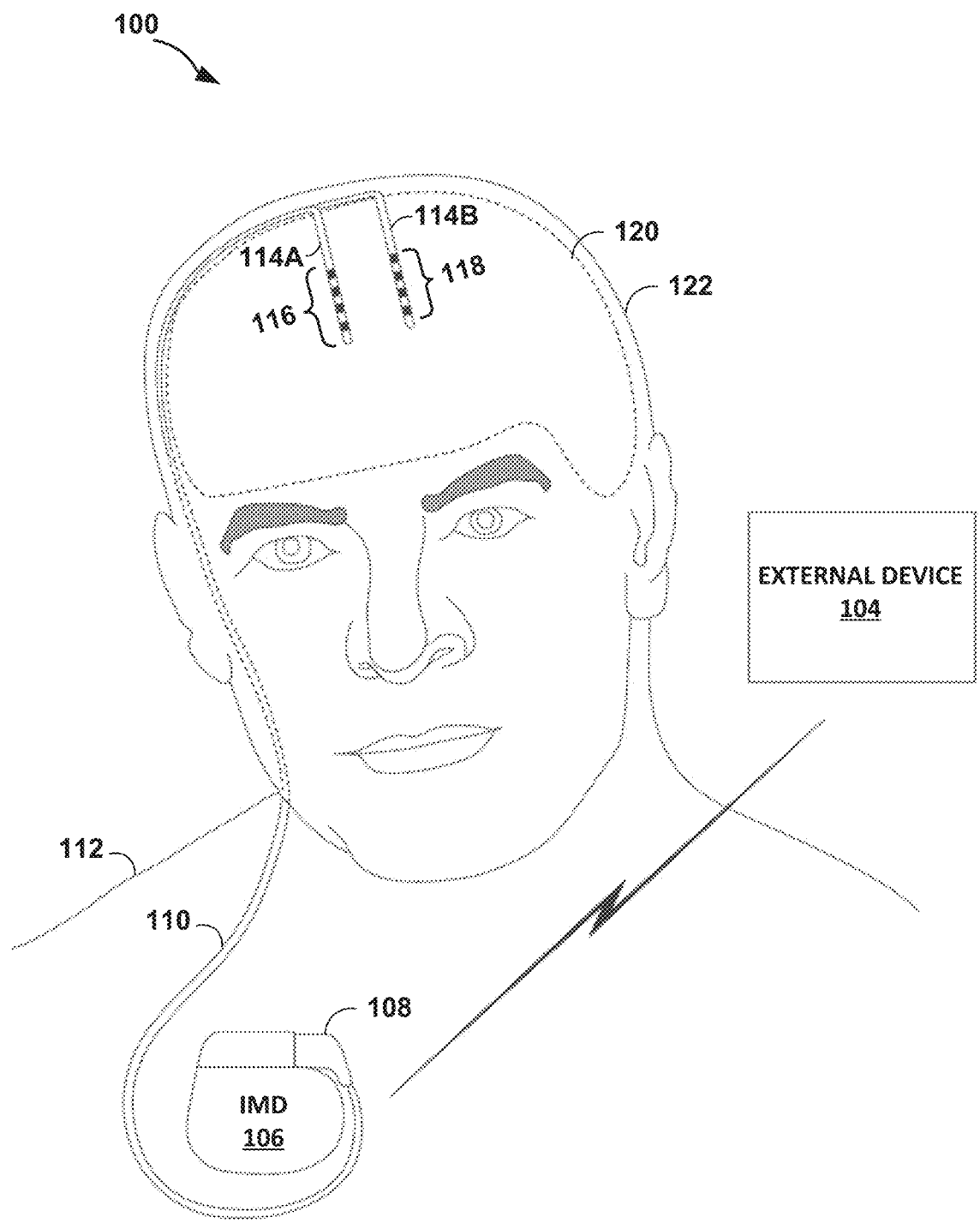
FIG. 1 is a conceptual diagram illustrating an example system that includes an implantable medical device (IMD) configured to deliver electrical stimulation to a patient according to an example of the techniques of the disclosure.

This disclosure describes example techniques for systems configured to deliver electrical stimulation therapy (e.g., neuromodulation such as deep brain stimulation (DBS), spinal cord stimulation (SCS), sacral nerve stimulation (SNS), or peripheral nerve stimulation therapy). For example, the system may be configured to adjust advertising intervals and the start and end of telemetry sessions based on sensed information. Electrical stimulation therapy may be delivered via multiple electrodes of one or more leads (e.g., cylindrical or paddle leads) implanted to provide stimulation in the brain, in the spinal cord, in the sacral nerve, or the percutaneous tibial nerve stimulation of a patient. In some examples, electrical stimulation therapy may be delivered via a leadless device. Electrical stimulation therapy may be adaptively adjusted for a patient using at least one program parameter.

For example, sensing circuitry may sense one or more bioelectric signals of a brain or nerve of a patient and stimulation generation circuitry may generate the electrical stimulation based on the one or more bioelectric signals. However, techniques described herein may apply to all types of medical devices (e.g., implantable medical devices), particularly those that have a patient programmer as an external device where, for purposes of user experience, the response of the interaction between the patient and the external device should appear to be minimal (e.g., no delay, a 1-5 second delay, 5-10 second delay, less than a 30 second delay, etc.) when the patient requests to perform an action on the external device. This may directly apply to neuromodulation devices such as, for example, spinal cord stimulation (SCS) devices, deep brain stimulation (DBS) devices, sacral nerve stimulation (SNS) devices, or peripheral nerve stimulation therapy.

Neuromodulation telemetry systems may use Bluetooth™ (ISM bands from 2.402 to 2.48 GHz) or other wireless technology protocols (e.g., RF protocols) to implement communication with programming instruments including proprietary external programmers and commercial off-the-shelf instruments such as cellphones and tablets. Access to external instruments may help to enable recharge and product longevity, and may help to prevent high risk procedures like replacement surgeries for implantable devices. Impact of high frequency protocols may be high on device longevity and is directly proportional to connection/advertising intervals. Faster advertising leads to faster connection and reduced latency, but this means higher current drain and reduced device longevity.

The energy needed to either maintain a distance telemetry session or make an implantable medical device immediately responsive for the user can consume a significant proportion of the energy from an implantable device. Techniques described herein may configure a system to use sensors (e.g., an accelerometer, a light sensor, or a microphone) to indicate when a patient is not likely to need a fast connection/response and/or preemptively start initiating connecting to the implantable device before a user request for the connection in order to improve the response time and usability of the system while being able to reduce the communication energy drain when the communication is not likely to be needed (e.g., when the user is sleeping).

Techniques described herein may configure a system to change an advertising interval (e.g., a Bluetooth™ Low Energy advertising interval or another advertising interval) of the medical device (e.g., an implanted medical device) based on information obtained by the medical device and/or an external programmer (e.g., a patient programmer, a clinician programmer, or a mobile device). When it is unlikely that the patient wants to interact with the implant, the advertising interval can be lengthened, which may potentially save energy. Saving energy may help to optimize telemetry performance and/or efficiency, which can help make the medical device (e.g., an implanted medical device) last longer.

For example, a user (e.g., a patient or a caretaker) may place an external device (e.g., a mobile device such as a cell phone) on a table or other stationary place at night where the accelerometer in the external device does not detect movement. Because the user may move the external device from the stationary place to their hand to program, the accelerometer in the external device may detect movement of the external device. In this example, the external device, if in range of the medical device (e.g., on a bedside table), can output an instruction to the medical device to increase the advertising interval of the medical device for a communication session with the medical device when no movement of the external device is detected. When the user picks up the external device again, the external device may detect the movement and may start to initiate a communication session to the device even if the communication session has not been requested yet by the user, and if successfully connected, can not only start the communication session in preparation for the need for the user to communicate with the medical device, but change (e.g., reduce) the advertising interval to something faster in preparation for further activity. The time of day could also be an input into the techniques described herein, as the external device could reduce its advertising interval to something faster at a certain time in the morning, for example, in preparation that the patient will be waking up soon based on a setting or historical information of when they typically access their external device (e.g., phone) in the morning. While the foregoing example used an accelerometer, in some examples the external device may additionally, or alternatively, include a gyroscope that may detect the movement and/or generate motion information.

If the medical device has an accelerometer, the accelerometer could also be used to increase or decrease the advertising interval (e.g., an BLE advertising interval). If the patient changes posture away from lying down, the external device could decrease the advertising interval of the medical device. The system (e.g., the medical device) could also decrease the advertising interval based on any sensed movement of the patient while lying down for a set period, just in case the patient is moving in order to gain access to their external device (e.g., a patient programmer). This may make the system appear more responsive than waiting for the external programmer to initiate a decrease in advertising interval, as the external device needs to wait to communicate to the medical device in order to change the advertising interval of the medical device.

It may be advantageous for the external device to increase the advertising interval based on non-activity/movement of the external device but have the medical device, either through motion or a time of day, decrease its advertising interval (with the external device also decreasing the advertising interval upon movement if the device has not done it already). For example, a patient unexpectedly wakes up at night and wants to change settings and the medical device does not have an accelerometer to know there is movement of the patient. In this example, the external device may attempt to decrease the advertising interval (e.g., increase the advertising rate) of the implanted device when the external device is first moved.

Light sensors on the external device could also be used as an indicator, as if the external device is in a dark room, it is less likely to be used to communicate with the implanted medical device. If the external device is locked or put in do not disturb mode, this could also be an indication that the user is preparing to not use the external device for communicating with the implanted medical device and going to bed, especially in conjunction with no movement of the external device.

An example problem being addressed in this disclosure is to have a more functional connection such that the device longevity is improved while not adversely impacting a user experience of connection latency. Techniques described herein include "smart" wireless connectivity (e.g., radiofrequency telemetry) by, for example, varying latency and advertising intervals using control factors, providing improvement in device longevity.

In accordance with the techniques of the disclosure, a system may enable smart connection parameters for communications using an adaptive learning algorithm with inputs like historic daily connection times, sensor information, direct user input, type of other connections, a geographical location, application access, etc. In this way, the system may implement smart connectivity driving optimized longevity of a battery of the medical device (e.g., an implantable medical device) and an optimized individual tailor-made user experience that reduces or even eliminates a connection latency. As an output, the user may disable the adaptive learning algorithm at the cost of longevity. Techniques described herein may help to allow the medical device to function to optimum performance levels exceling in patient experience while improving device longevity. Techniques described herein may help to allow patients to use an implantable medical device for a longer time, therefore reducing the risk of replacement surgeries.

Smart connectivity can also be assisted with in-band stings, such as, for example, inductive downlinks over inductive telemetry (e.g., telecoil, Tel-N, or Tel-B) and/or in-band stings (e.g., within a wireless band such as a BLE band) to the implant making the advertising rate temporarily fast to enable faster communications. This "sting" can also be used as a manufacturing tool to connect to the correct device faster. As used herein a sting (e.g., an in-band sting or an out-of-band sting) may refer to a burst or a patterned burst for communication. Stinging may not necessarily include advertisements or handshaking. For instance, an inductive telemetry device may be placed near an implanted medical device to cause the medical device to establish a connection more quickly than if not for the inductive sting. In this instance, the medical device may "ping" other devices, for example, by outputting an advertisement that another device (e.g., an external device) may listen for in order to determine if there is a device out there for exchanging communications. The ping may be a telemetry output from the medical device and may be in-band (e.g., a BLE advertisement) or out-of-band.

The medical device may output the advertisement for a connection between the medical device and an external based on an advertising interval. As used herein, an advertisement for a connection may include one or more packets (e.g., one or more advertisement packets) sent to inquire whether communication should be initiated. An advertising interval may refer to a rate at which an advertising device (e.g., a medical device) outputs the advertisement. For example, the medical device may periodically output an advertisement for connection (e.g., an advertisement packet) at an advertising interval (e.g., less than 100 ms, 100 ms to 500 ms, 1 second, more than 1 second, etc.) with a random delay. An advertising device (e.g., the medical device) may broadcast the advertisement for connection at the advertising interval to two unconnected devices such that more than one device can listen and establish a connection with the advertising device using the advertisement for connection. The advertisement for connection may include information on how to connect with the advertising device, such as, for example, one or more of: (1) media access control (MAC) addresses for the medical device and external device; (2) a real time-point in time for the transfer to start; (3) an indication of a starting frequency; (4) an indication of a hop set; (5) a connection interval; or (6) a connection latency.

FIG. 1 is a conceptual diagram illustrating an example system 100 that includes an implantable medical device (IMD) 106 configured to deliver adaptive deep brain stimulation (DBS) to a patient 112. Although the examples described in this disclosure are generally applicable to a variety of medical devices including external devices and IMDs, application of such techniques to IMDs and, more particularly, implantable electrical stimulators (e.g., neurostimulators) will be described for purposes of illustration. More particularly, the disclosure will refer to an implantable DBS system for purposes of illustration, but without limitation as to other types of medical devices or other therapeutic applications of stimulation. For example, in some examples, one or more components of system 100 may be configured to deliver one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS), or any other stimulation therapy capable of treating a condition of patient 122.

DBS may be adaptive in the sense that IMD 106 may adjust, increase, or decrease the magnitude of one or more parameters of the DBS in response to changes in patient activity or movement, a severity of one or more symptoms of a disease of the patient, a presence of one or more side effects due to the DBS, or one or more sensed signals of the patient. For instance, one example of system 100 is a bi-directional DBS system with capabilities to both deliver stimulation and sense intrinsic neuronal signals. System 100 may provide for "closed-loop" therapy where IMD 106 may continuously monitor the state of certain biomarker signals and deliver stimulation according to pre-programmed routines based on the biomarker signals.

System 100 may be configured to treat a patient condition, such as a movement disorder, neurodegenerative impairment, a mood disorder, or a seizure disorder of patient 112. Patient 112 ordinarily is a human patient. In some cases, however, therapy system 100 may be applied to other mammalian or non-mammalian, non-human patients. While movement disorders and neurodegenerative impairment are primarily referred to herein, in other examples, therapy system 100 may provide therapy to manage symptoms of other patient conditions, such as, but not limited to, seizure disorders (e.g., epilepsy) or mood (or psychological) disorders (e.g., major depressive disorder (MDD), bipolar disorder, anxiety disorders, post-traumatic stress disorder, dysthymic disorder, and obsessive-compulsive disorder (OCD)) as well as, for example, neural control of prosthetic devices or stimulation to provide sensory feedback to the patients. At least some of these disorders may be manifested in one or more patient movement behaviors. A movement disorder or other neurodegenerative impairment may include symptoms such as, for example, muscle control impairment, motion impairment or other movement problems, such as rigidity, spasticity, bradykinesia, rhythmic hyperkinesia, nonrhythmic hyperkinesia, and akinesia. In some cases, the movement disorder may be a symptom of Parkinson's disease. However, the movement disorder may be attributable to other patient conditions.

Example therapy system 100 includes medical device external device 104, implantable medical device (IMD) 106, lead extension 110, one or more leads 114A and 114B with respective sets of one or more electrodes 116, 118. In the example shown in FIG. 1, electrodes 116, 118 of leads 114A, 114B are positioned to deliver electrical stimulation to a tissue site within brain 120, such as a deep brain site under the dura mater of brain 120 of patient 112. In some examples, delivery of stimulation to one or more regions of brain 120, such as the subthalamic nucleus, globus pallidus or thalamus, may be an effective treatment to manage movement disorders, such as Parkinson's disease. Some or all of electrodes 116, 118 also may be positioned to sense neurological brain signals within brain 120 of patient 112. In some examples, some of electrodes 116, 118 may be configured to sense neurological brain signals and others of electrodes 116, 118 may be configured to deliver adaptive electrical stimulation to brain 120. In other examples, all of electrodes 116, 118 are configured to both sense neurological brain signals and deliver adaptive electrical stimulation to brain 120. In some examples, unipolar stimulation may be possible where one electrode is on the housing of IMD 106.

IMD 106 includes a therapy module (e.g., which may include processing circuitry, signal generation circuitry or other electrical circuitry configured to perform the functions attributed to IMD 106) that includes a stimulation generator configured to generate and deliver electrical stimulation therapy to patient 112 via a subset of electrodes 116, 118 of leads 114A and 114B, respectively. The subset of electrodes 116, 118 that are used to deliver electrical stimulation to patient 112, and, in some cases, the polarity of the subset of electrodes 116, 118, may be referred to as a stimulation electrode combination. As described in further detail below, the stimulation electrode combination can be selected for a particular patient 112 and target tissue site (e.g., selected based on the patient condition). The group of electrodes 116, 118 includes at least one electrode and can include a plurality of electrodes. In some examples, the plurality of electrodes 116 and/or 118 may have a complex electrode geometry such that two or more electrodes are located at different positions around the perimeter of the respective lead.

In some examples, neurological signals sensed within brain 120 may reflect changes in electrical current produced by the sum of electrical potential differences across brain tissue. Examples of neurological brain signals include, but are not limited to, bioelectric signals generated from local field potentials (LFP) sensed within one or more regions of brain 120. Electroencephalogram (EEG) signal or an electrocorticogram (ECoG) signal are also examples of bioelectric signals. For example, neurons generate the bioelectric signals, and if measured at depth, it is LFP, if measured on the cerebral cortex, it is ECoG, and if on scalp, it is EEG. In this disclosure, the term "oscillatory signal source" may be used to describe one example of a signal source that generates bioelectric signals. However, the bioelectric signals are not limited to oscillatory signals. For example purposes, the techniques are described with oscillatory bioelectric signals from an oscillatory signal source.

In some examples, the neurological brain signals that are used to select a stimulation electrode combination may be sensed within the same region of brain 120 as the target tissue site for the electrical stimulation. As previously indicated, these tissue sites may include tissue sites within anatomical structures such as the thalamus, subthalamic nucleus or globus pallidus of brain 120, as well as other target tissue sites. The specific target tissue sites and/or regions within brain 120 may be selected based on the patient condition. Thus, in some examples, both stimulation electrode combinations and sense electrode combinations may be selected from the same set of electrodes 116, 118. In other examples, the electrodes used for delivering electrical stimulation may be different than or the same as the electrodes used for sensing neurological brain signals.

Electrical stimulation generated by IMD 106 may be configured to manage a variety of disorders and conditions. In some examples, the stimulation generator of IMD 106 is configured to generate and deliver electrical stimulation pulses to patient 112 via electrodes of a selected stimulation electrode combination. However, in other examples, the stimulation generator of IMD 106 may be configured to generate and deliver a continuous wave signal, e.g., a sine wave or triangle wave. In either case, a stimulation generator within IMD 106 may generate the electrical stimulation therapy for DB S according to a selected therapy program. In examples in which IMD 106 delivers electrical stimulation in the form of stimulation pulses, a therapy program may include a set of therapy parameter values (e.g., stimulation parameters), such as a stimulation electrode combination for delivering stimulation to patient 112, pulse frequency, pulse width, and a current or voltage amplitude of the pulses. As previously indicated, the electrode combination may indicate the specific electrodes 116, 118 that are selected to deliver stimulation signals to tissue of patient 112 and the respective polarities of the selected electrodes. As described further, the electrical stimulation generated by IMD 106 may generate, for example, burst pulses, interleaved pulses, or concurrent pulses.

In some examples, electrodes 116, 118 may be radially-segmented DBS arrays (rDBSA) of electrodes. Radially-segmented DBS arrays refer to electrodes that are segmented radially along the lead. As one example, leads 114A and 114B may include a first set of electrodes arranged circumferentially around leads 114A and 114B that are all at the same height level on leads 114A and 114B. Each of the electrodes in the first set of electrodes is a separate segmented electrode and form a level of radially-segmented array of electrodes. Leads 114A and 114B may include a second set of electrodes arranged circumferentially around leads 114A and 114B that are all at the same height level on leads 114A and 114B. Each of the electrodes in the first set of electrodes is a separate segmented electrode and form a level of radially-segmented array of electrodes. The rDBSA electrodes may be beneficial for directional stimulation and sensing.

IMD 106 may be implanted within a subcutaneous pocket above the clavicle, or, alternatively, on or within cranium 122 or at any other suitable site within patient 112. Generally, IMD 106 is constructed of a biocompatible material that resists corrosion and degradation from bodily fluids. IMD 106 may comprise a hermetic housing to substantially enclose components, such as a processor, therapy module, and memory.

As shown in FIG. 1, implanted lead extension 110 is coupled to IMD 106 via connector 108 (also referred to as a connector block or a header of IMD 106). In the example of FIG. 1, lead extension 110 traverses from the implant site of IMD 106 and along the neck of patient 112 to cranium 122 of patient 112 to access brain 120. In the example shown in FIG. 1, leads 114A and 114B (collectively "leads 114") are implanted within the right and left hemispheres (or in just one hemisphere in some examples), respectively, of patient 112 in order to deliver electrical stimulation to one or more regions of brain 120, which may be selected based on the patient condition or disorder controlled by therapy system 100. The specific target tissue site and the stimulation electrodes used to deliver stimulation to the target tissue site, however, may be selected, e.g., according to the identified patient behaviors and/or other sensed patient parameters. For example, the target tissue site may be the location of the oscillatory signal source that generates the bioelectric signal having a signal component in the beta frequency band. The stimulation electrodes used to deliver stimulation to the target tissue site may be those that are most proximal to the oscillatory signal source, e.g., using the example techniques described in this disclosure. Other lead 114 and IMD 106 implant sites are contemplated depending on clinical application or target tissue/nerve. For example, IMD 106 may be implanted on or within cranium 122, in some examples. Leads 114A and 114B may be implanted within the same hemisphere or IMD 106 may be coupled to a single lead implanted in a single hemisphere, in some examples.

Existing lead sets include axial leads carrying ring electrodes disposed at different axial positions and so-called "paddle" leads carrying planar arrays of electrodes. Selection of electrode combinations within an axial lead, a paddle lead, or among two or more different leads presents a challenge to the clinician. In some examples, more complex lead array geometries may be used. Pelvic stimulation may use cuff electrodes wrapped around the sacral (or other pelvic) nerve.

Although leads 114 are shown in FIG. 1 as being coupled to a common lead extension 110, in other examples, leads 114 may be coupled to IMD 106 via separate lead extensions or directly to connector 108. Leads 114 may be positioned to deliver electrical stimulation to one or more target tissue sites within brain 120 to manage patient symptoms associated with a movement disorder of patient 112. Leads 114 may be implanted to position electrodes 116, 118 at desired locations of brain 120 through respective holes in cranium 122. Leads 114 may be placed at any location within brain 120 such that electrodes 116, 118 are capable of providing electrical stimulation to target tissue sites within brain 120 during treatment. For example, electrodes 116, 118 may be surgically implanted under the dura mater of brain 120 or within the cerebral cortex of brain 120 via a burr hole in cranium 122 of patient 112, and electrically coupled to IMD 106 via one or more leads 114.

In the example shown in FIG. 1, electrodes 116, 118 of leads 114 are shown as ring electrodes. Ring electrodes may be used in DBS applications because ring electrodes are relatively simple to program and are capable of delivering an electrical field to any tissue adjacent to electrodes 116, 118. In other examples, electrodes 116, 118 may have different configurations. For example, at least some of the electrodes 116, 118 of leads 114 may have a complex electrode array geometry that is capable of producing shaped electrical fields. The complex electrode array geometry may include multiple electrodes (e.g., partial ring or segmented electrodes) around the outer perimeter of each lead 114, rather than one ring electrode. In this manner, electrical stimulation may be directed in a specific direction from leads 114 to enhance therapy efficacy and reduce possible adverse side effects from stimulating a large volume of tissue.

In some examples, a housing of IMD 106 may include one or more stimulation and/or sensing electrodes. In some examples, leads 114 may have shapes other than elongated cylinders as shown in FIG. 1. For example, leads 114 may be paddle leads, spherical leads, bendable leads, or any other type of shape effective in treating patient 112 and/or minimizing invasiveness of leads 114.

IMD 106 includes a memory to store a plurality of therapy programs that each define a set of therapy parameter values. In some examples, IMD 106 may select a therapy program from the memory based on various parameters, such as sensed patient parameters and the identified patient behaviors. IMD 106 may generate electrical stimulation based on the parameters of the selected therapy program to manage the patient symptoms associated with a movement disorder.

External device 104 wirelessly communicates with IMD 106 as needed to provide or retrieve therapy information. External device 104 is an external computing device that the user, e.g., a clinician and/or patient 112, may use to communicate with IMD 106. For example, external device 104 may be a clinician programmer that the clinician uses to communicate with IMD 106 and program one or more therapy programs for IMD 106. Alternatively, external device 104 may be a patient programmer that allows patient 112 to select programs and/or view and modify therapy parameters. The clinician programmer may include more programming features than the patient programmer. In other words, more complex or sensitive tasks may only be allowed by the clinician programmer to prevent an untrained patient from making undesirable changes to IMD 106.

When external device 104 is configured for use by the clinician, external device 104 may be used to transmit initial programming information to IMD 106. This initial information may include hardware information, such as the type of leads 114 and the electrode arrangement, the position of leads 114 within brain 120, the configuration of electrode array 116, 118, initial programs defining therapy parameter values, and any other information the clinician desires to program into IMD 106. External device 104 may also be capable of completing functional tests (e.g., measuring the impedance of electrodes 116, 118 of leads 114).

The clinician may also store therapy programs within IMD 106 with the aid of external device 104. During a programming session, the clinician may determine one or more therapy programs that may provide efficacious therapy to patient 112 to address symptoms associated with the patient condition, and, in some cases, specific to one or more different patient states, such as a sleep state, movement state or rest state. For example, the clinician may select one or more stimulation electrode combinations with which stimulation is delivered to brain 120. During the programming session, the clinician may evaluate the efficacy of the specific program being evaluated based on feedback provided by patient 112 or based on one or more physiological parameters of patient 112 (e.g., muscle activity, muscle tone, rigidity, tremor, etc.). Alternatively, identified patient behavior from video information may be used as feedback during the initial and subsequent programming sessions. External device 104 may assist the clinician in the creation/identification of therapy programs by providing a methodical system for identifying potentially beneficial therapy parameter values.

However, in some examples, IMD 106 or external device 104 (e.g., a medical device), alone or in combination, may automatically determine electrode configuration and therapy parameters. For example, the medical device may determine which electrodes to use for stimulation based on which electrodes are most proximal to the oscillatory signal source. In some examples, external device 104 may output information indicating the selected electrode configuration for stimulation and the determined stimulation amplitude or other therapy parameter for the clinician or physician to review and confirm before IMD 106 delivers therapy via the selected electrode configuration with the determined stimulation amplitude.

External device 104 may also be configured for use by patient 112. When configured as a patient programmer, external device 104 may have limited functionality (compared to a clinician programmer) in order to prevent patient 112 from altering critical functions of IMD 106 or applications that may be detrimental to patient 112. In this manner, external device 104 may only allow patient 112 to adjust values for certain therapy parameters or set an available range of values for a particular therapy parameter. For example, external device 104 may only allow patient 112 to adjust an amplitude or an intensity (by combination or amplitude, pulse width and/or pulse rate).

External device 104 may also provide an indication to patient 112 when therapy is being delivered, when patient input has triggered a change in therapy or when the power source within external device 104 or IMD 106 needs to be replaced or recharged. For example, external device 104 may include an alert LED and/or a touchscreen, may flash a message to patient 112 via a programmer display, generate an audible sound or somatosensory cue to confirm patient input was received, e.g., to indicate a patient state or to manually modify a therapy parameter.

Therapy system 100 may be implemented to provide chronic stimulation therapy to patient 112 over the course of several months or years. However, system 100 may also be employed on a trial basis to evaluate therapy before committing to full implantation. If implemented temporarily, some components of system 100 may not be implanted within patient 112. For example, patient 112 may be fitted with an external medical device, such as a trial stimulator, rather than IMD 106. The external medical device may be coupled to percutaneous leads or to implanted leads via a percutaneous extension. If the trial stimulator indicates DBS system 100 provides effective treatment to patient 112, the clinician may implant a chronic stimulator within patient 112 for relatively long-term treatment.

Although IMD 106 and system 100 are described as delivering electrical stimulation therapy to brain 120, IMD 106 and system 100 may be configured to direct electrical stimulation to other anatomical regions of patient 112. Further, an IMD may provide other electrical stimulation such as spinal cord stimulation to treat a movement disorder. For example, in some examples, an IMD may be configured to deliver one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS), or any other stimulation therapy capable of treating a condition of patient 122.

In some examples, IMD 106 may be configured to provide electrical stimulation for treatment of a patient condition supplemental to medication provided to patient 122. Although some examples are described with the use of IMD 106 that provides stimulation, the techniques are not limited and the techniques may apply to examples where no stimulation is provided. For example, IMD 106 may not provide stimulation and treatment of a patient condition of patient 122 may be provided by medication or by medication with other techniques. For instance, IMD 106 may use LFP to determine medication for one disorder of patient 122 and may apply stimulation for another disorder of patient 122. For example, patient 122 may have a dual disease like Parkinson's disease and Dystonia and leads 114 are in locations to treat both Parkinson's disease and Dystonia. A single IMD 106 may listen/monitor to different LFP bands to look at various medication or disease states via the same lead/same hemisphere or different hemispheres.

According to the techniques of the disclosure, external device 104 may be configured to use sensor information detected by external device 104 to determine an advertising interval for communication between external device 104 and IMD 106. For example, external device 104 may use sensor information (e.g., movement information, a light level, or a sound level) detected by external device 104. In this example, external device 104 may determine an advertising interval of external device 104 for communication between external device 104 and IMD 106 based on the sensor information from external device 104. For instance, external device 104 may determine to reduce the advertising interval of external device 104 from a current advertising interval in response to an increase in a movement of external device 104 and increase the advertising interval from the current advertising interval in response to a decrease in the movement of external device 104. In this example, external device 104 may configure IMD 106 and/or external device 104 to communicate using the determined advertising interval. For example, external device 104 may configure IMD 106 to advertise information related to the intentions of the external devices (e.g. intended session information) at the determined advertising interval. IMD 106 may advertise the advertisement at the determined advertising interval. External device 104 may establish a communication session between IMD 106 and external device 104 using the advertisement. External device 104 may output, using the communication session, an indication of the determined advertising interval to cause IMD 106 to communicate the advertisement at the determined advertising interval. In this way, system 100 may help to reduce a time to initiate communication between IMD 106 to external device 104 when the user (e.g., patient 112, a caretaker of patient 112, or a clinician associated with patient 112) is likely to request the connection to help to improve the response time and usability of system 100 while also potentially reducing the communication energy drain when the communication is not likely to be needed (e.g., when patient 112 is sleeping).

In some examples, system 100 may determine to preemptively initiate a communication session for communication between external device 104 and IMD 106 based on sensor information from external device 104. For instance, system 100 (e.g., external device 104) may determine to initiate the communication session in response to an increase in a movement of external device 104. In some examples, system 100 may determine to initiate the communication session in response to the increase in the movement of external device 104 and further in response to a determination that the movement has been less than a threshold for a predetermined period of time (e.g., 30 minutes). In this way, system 100 may help to reduce an apparent time to initiate communication between IMD 106 to external device 104 when the user (e.g., patient 112, a caretaker of patient 112, or a clinician associated with patient 112) is likely to request the connection to help to improve the response time and usability of the system while also potentially reducing the communication energy drain when the communication is not likely to be needed (e.g., when patient 112 is sleeping).

In accordance with the techniques of the disclosure, system 100 may enable smart connection parameters for communications using an adaptive learning algorithm with inputs like historic daily connection times, sensor information, direct user input, type of other connections, a geographical location, application access, etc. In this way, system 100 may implement smart connectivity driving optimized longevity of a battery of IMD 106 and an optimized individual tailor-made user experience that reduces a connection latency. Techniques described herein may help to allow IMD 106 to function to optimum performance levels exceling in patient experience while improving device longevity. Techniques described herein may help to allow patient 102 to use IMD 106 for a longer time, therefore reducing the risk of replacement surgeries.

Figure 2:
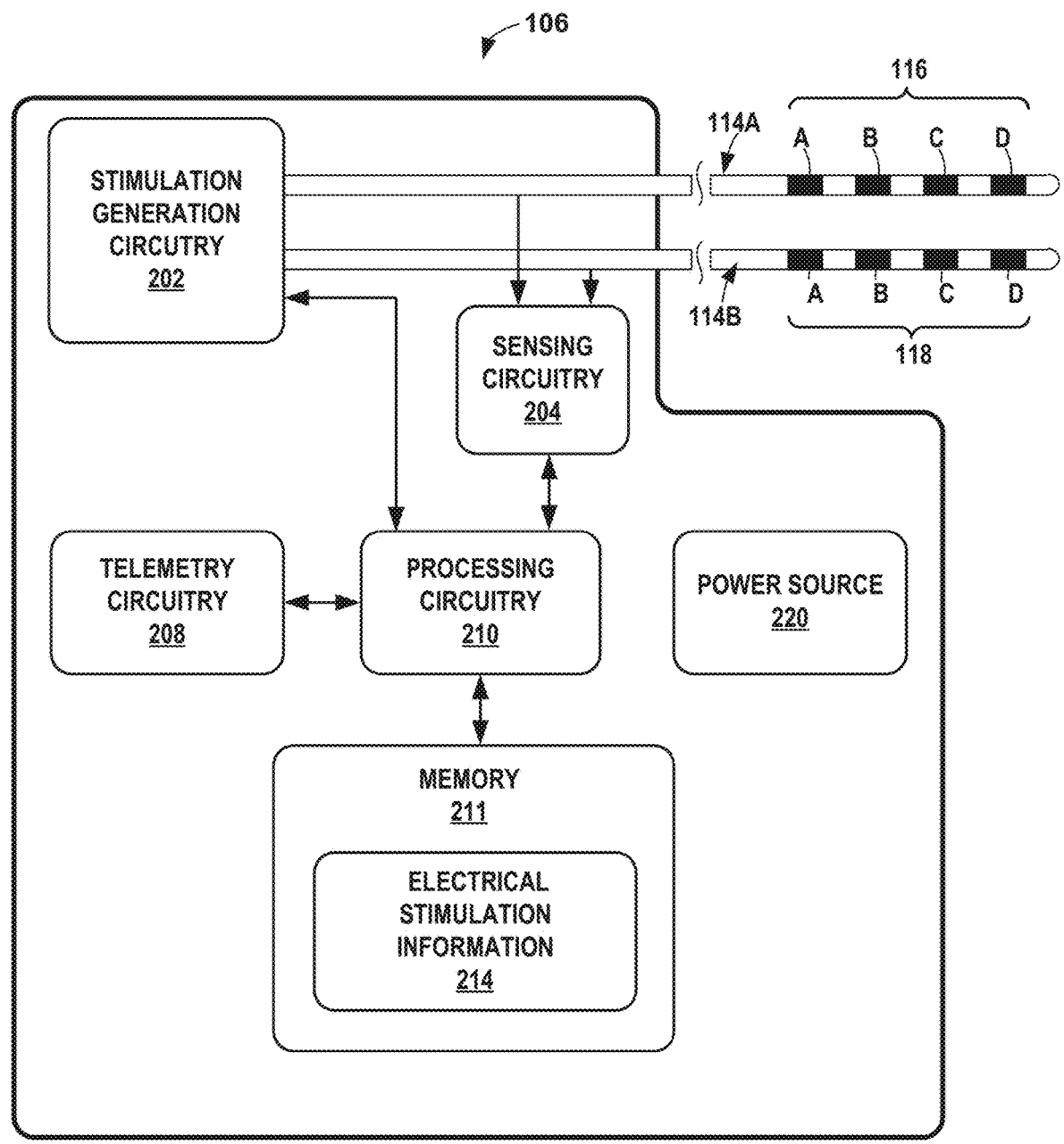
FIG. 2 is a block diagram of the example IMD of FIG. 1 for delivering electrical stimulation according to an example of the techniques of the disclosure.

FIG. 2 is a block diagram of the example IMD 106 of FIG. 1 for delivering stimulation therapy, such as adaptive deep brain stimulation therapy. In the example shown in FIG. 2, IMD 106 includes processing circuitry 210, memory 211, stimulation generation circuitry 202, sensing circuitry 204, and telemetry circuitry 208, and power source 220. Each of these circuits may be or include electrical circuitry configured to perform the functions attributed to each respective circuit. Memory 211 may include any volatile or non-volatile media, such as a random-access memory (RAM), read only memory (ROM), non-volatile RAM (NVRAM), ferroelectric RAM (FRAM), electrically erasable programmable ROM (EEPROM), flash memory, and the like. Memory 211 may store computer-readable instructions that, when executed by processing circuitry 210, cause IMD 106 to perform various functions. Memory 211 may be a storage device or other non-transitory medium.

In the example shown in FIG. 2, memory 211 stores electrical stimulation information 214. Electrical stimulation information 214 may include program parameters (e.g., a therapy parameter set), such as a stimulation electrode combination, electrode polarity, current or voltage amplitude, pulse width, and pulse rate. In some examples, individual therapy programs may be stored as a therapy group, which defines a set of therapy programs with which stimulation may be generated. The stimulation signals defined by the therapy programs of the therapy group may be delivered together on an overlapping or non-overlapping (e.g., time-interleaved) basis.

Stimulation generation circuitry 202, under the control of processing circuitry 210, generates stimulation signals for delivery to patient 112 via selected combinations of one or more electrodes 116, 118. An example range of electrical stimulation parameters believed to be effective in DBS to manage a movement disorder of patient include:
1. Pulse Rate, i.e., Frequency: between approximately 40 Hertz and approximately 500 Hertz, such as between approximately 90 to 170 Hertz or such as approximately 90 Hertz.
2. In the case of a voltage controlled system, Voltage Amplitude: between approximately 0.1 volts and approximately 5 volts, such as between approximately 2 volts and approximately 3 volts.
3. In the case of a current controlled system, Current Amplitude: between approximately 1 milliamps to approximately 8 milliamps, such as between approximately 1.0 milliamps and approximately 3 milliamps.
4. Pulse Width: between approximately 20 microseconds and approximately 500 microseconds, such as between approximately 50 microseconds and approximately 200 microseconds.

Accordingly, in some examples, stimulation generation circuitry 202 may generate electrical stimulation signals in accordance with the electrical stimulation parameters noted above, which may be examples of program parameters. Other ranges of therapy parameter values may also be useful, and may depend on the target stimulation site within patient 112. While stimulation pulses are described, stimulation signals may be of any form, such as continuous-time signals (e.g., sine waves) or the like.

Processing circuitry 210 may include fixed function processing circuitry and/or programmable processing circuitry, and may comprise, for example, any one or more of a microprocessor, a controller, a digital signal processor (DSP), an application specific integrated circuit (ASIC), a field-programmable gate array (FPGA), discrete logic circuitry, or any other processing circuitry configured to provide the functions attributed to processing circuitry 210 herein may be embodied as firmware, hardware, software or any combination thereof. Processing circuitry 210 may control stimulation generation circuitry 202 according to therapy programs 214 stored in memory 211 to apply particular stimulation parameter values specified by one or more of programs, such as voltage amplitude or current amplitude, pulse width, and/or pulse rate.

In the example shown in FIG. 2, the set of electrodes 116 includes electrodes 116A, 116B, 116C, and 116D, and the set of electrodes 118 includes electrodes 118A, 118B, 118C, and 118D. Processing circuitry 210 may control individual voltage or current sources and sinks coupled to respective electrodes 116, 118, functioning as cathodes or anodes, to delivery stimulation signals to patient tissue. In other examples, processing circuitry may control switch circuitry to apply the stimulation signals generated by stimulation generation circuitry 202 to selected combinations of electrodes 116, 118.

Stimulation generation circuitry 202 may be a single channel or multi-channel stimulation generator. In particular, stimulation generation circuitry 202 may be capable of delivering a single stimulation pulse, multiple stimulation pulses, or a continuous signal at a given time via a single electrode combination or multiple stimulation pulses at a given time via multiple electrode combinations. For example, as mentioned above, stimulation generation circuitry 202 may comprise multiple voltage or current sources and sinks that are coupled to respective electrodes to drive the electrodes as cathodes or anodes simultaneously or at different times. In this example, IMD 106 may not require the functionality of switch circuitry for time-interleaved multiplexing of stimulation via different electrodes. In other examples, however, stimulation generation circuitry 202 may be configured to deliver multiple channels on a time-interleaved basis. For example, switch circuitry may serve to time divide the output of stimulation generation circuitry 202 across different electrode combinations at different times to deliver multiple programs or channels of stimulation energy to patient 112.

Electrodes 116, 118 on respective one or more leads 114 may be constructed of a variety of different designs. For example, one or both of leads 114 may include two or more electrodes at each longitudinal location along the length of the lead, such as multiple electrodes, e.g., arranged as segments, at different perimeter locations around the perimeter of the lead at each of the locations A, B, C, and D.

As an example, one or both of leads 114 may include radially-segmented DBS arrays (rDBSA) of electrodes. In the rDBSA, as one example, there may be a first ring electrode of electrodes 116 around the perimeter of lead 114A at a first longitudinal location on lead 114A (e.g., location A). Below the first ring electrode, there may be three segmented electrodes of electrodes 116 around the perimeter of lead 114A at a second longitudinal location on lead 114A (e.g., location B). Below the three segmented electrodes, there may be another set of three segmented electrodes of electrodes 116 around the perimeter of lead 114A at a third longitudinal location of lead 114A (e.g., location C). Below the three segmented electrodes, there may be a second ring electrode of electrodes 116 around the perimeter of lead 114A (e.g., location D). Electrodes 118 may be similarly positioned along lead 114B.

The above is one example of the rDBSA array of electrodes, and the example techniques should not be considered limited to such an example. There may be other configurations of electrodes for DBS. Moreover, the example techniques are not limited to DBS, and other electrode configurations are possible.

In one example, the electrodes 116, 118 may be electrically coupled to switch circuitry via respective wires that are straight or coiled within the housing of the lead and run to a connector at the proximal end of the lead. In another example, each of the electrodes 116, 118 of the leads 114 may be electrodes deposited on a thin film. The thin film may include an electrically conductive trace for each electrode that runs the length of the thin film to a proximal end connector. The thin film may then be wrapped (e.g., a helical wrap) around an internal member to form the leads 114. These and other constructions may be used to create a lead with a complex electrode geometry.

Although sensing circuitry 204 is incorporated into a common housing with stimulation generation circuitry 202 and processing circuitry 210 in FIG. 2, in other examples, sensing circuitry 204 may be in a separate housing from IMD 106 and may communicate with processing circuitry 210 via wired or wireless communication techniques. Example neurological brain signals include, but are not limited to, a signal generated from local field potentials (LFPs) within one or more regions of brain 120. EEG and ECoG signals are examples of local field potentials that may be measured within brain 120. LFPs, EEG and ECoG may be different measurements of the same bioelectric signals in the brain. The neurons generate the signals, and if measured at depth, it is LFP, if measured on the coretex, it is ECoG, if on the scalp, it is EEG. In general, the bioelectric signals may be formed by one or more oscillatory signal sources. The set of electrodes 116 and 118 that are most proximate to the oscillatory signal sources are good candidates to use for delivering therapy. Additionally, sensing circuitry 204 may sense EMG, ECAP, Electrogram Guided Myocardial Advanced Phenotypings (EMAPs), or other neural or physiological signals generated in response to a stimulation or in response to other evocation, muscle movement, user-evoked signals, etc. For example, incontinence therapy may involve sensing muscle and/or neural signals.

Telemetry circuitry 208 supports wireless communication (e.g., using Bluetooth™ Wi-Fi™, Near-Field Communication (NFC), Near Field Magnetic Induction (NFMI), Long Term Evolution, 5th generation (LTE/5G), or MedRadio (MICS: Medical Implant Communication Service, MEDS: Medical External Device Service, MBAD: Medical Body Area Network)) between IMD 106 and an external device 104 or another computing device under the control of processing circuitry 210. In some examples, telemetry circuitry 208 supports a telemetry frequency that may correspond to a high frequency or radio frequency, which may be a radio frequency established via Bluetooth, Wi-Fi, Near-Field Communication (NFC), 175 KHz inductive telemetry, or MICS, for example. Telemetry circuitry 208 may be configured to receive an inductive sting. Processing circuitry 210 of IMD 106 may receive, as updates to programs (e.g., at least one program parameter), values for various stimulation parameters such as magnitude and electrode combination, from external device 104 via telemetry circuitry 208. The updates to the therapy programs may be stored within therapy programs 214 portion of memory 211. Telemetry circuitry 208 in IMD 106, as well as telemetry modules in other devices and systems described herein, such as external device 104, may accomplish communication by radiofrequency (RF) communication techniques (e.g., Bluetooth, Wi-Fi, Near-Field Communication (NFC), or MICS). In addition, telemetry circuitry 208 may communicate with external medical device external device 104 via proximal inductive interaction of IMD 106 with external device 104. Accordingly, telemetry circuitry 208 may send information to external device 104 on a continuous basis, at periodic intervals, or upon request from IMD 106 or external device 104.

Telemetry circuitry 208 may periodically output an advertisement for a connection at an advertising interval (e.g., less than 100 ms, 100 ms to 500 ms, 1 second, more than 1 second, etc.) with an optional random delay. The advertisement may include information on how to connect with the advertising device, such as, for example, one or more of: (1) media access control (MAC) addresses for the medical device and external device; (2) a real time-point in time for the transfer to start; (3) an indication of a starting frequency; (4) an indication of a hop set; (5) a connection interval; or (6) a connection latency. In some examples, telemetry circuitry 208 may receive the advertisement and connect with another device (e.g., external device 104) using the received advertisement (e.g., using a starting frequency and hop set of the received advertising packet).

Power source 220 delivers operating power to various components of IMD 106. Power source 220 may include a small rechargeable or non-rechargeable battery and a power generation circuit to produce the operating power. Recharging may be accomplished through proximal inductive interaction between an external charger and an inductive charging coil within IMD 106. In some examples, power requirements may be small enough to allow IMD 106 to utilize patient motion and implement a kinetic energy-scavenging device to trickle charge a rechargeable battery. In other examples, traditional batteries may be used for a limited period of time.

Processing circuitry 210 of IMD 106 may sense, via electrodes 116, 118 interposed along leads 114 (and sensing circuitry 204), one or more bioelectric signals of brain 120 of patient 112. Further, processing circuitry 210 of IMD 106 may deliver, via electrodes 116, 118 (and stimulation generation circuitry 202), electrical stimulation therapy to patient 112 based on the sensed one or more bioelectric signals of brain 120. The adaptive DBS therapy is defined by electrical stimulation information 214. For example, electrical stimulation information 214 may include a current amplitude (for a current-controlled system) or a voltage amplitude (for a voltage-controlled system), a pulse rate or frequency, and a pulse width, or a number of pulses per cycle. In examples where the electrical stimulation is delivered according to a "burst" of pulses, or a series of electrical pulses defined by an "on-time" and an "off-time," the one or more parameters may further define one or more of a number of pulses per burst, an on-time, and an off-time. Processing circuitry 210, via electrodes 116, 118, delivers to patient 112 adaptive DBS and may adjust one or more parameters defining the electrical stimulation based on corresponding parameters of the sensed one or more bioelectric signals of brain 120.

In some examples, processing circuitry 210 may continuously measure the one or more bioelectric signals in real time. In other examples, processing circuitry 210 may periodically sample the one or more bioelectric signals according to a predetermined frequency or after a predetermined amount of time. In some examples, processing circuitry 210 may periodically sample the signal at a frequency of approximately 150 Hertz.

Telemetry circuitry 208 may be configured to output an advertisement, such as, advertisement for a wireless communication session or advertisement compliant with another protocol. For example, telemetry circuitry 208 may output the advertisement at an advertising interval. The advertising interval may include a Bluetooth Low Energy advertising interval. Telemetry circuitry 208 may ping external device 104. For example, telemetry circuitry 208 may output an advertisement or advertisement package that external device 104 or another device listens for in order to know if there is a device for exchanging communications. In some examples, the telemetry circuitry 208 may output the advertisement in response to a sting and/or may periodically output the advertisement using an advertising interval (e.g., with a random delay). As the pings take energy, telemetry circuitry 208 may benefit from sending pings in longer intervals when establishing a communication session with another device is unlikely compared to when establishing a communication session with another device is likely. The advertising itself may have a very small payload. The ping or advertisement may comprise security information for a communication session and/or connection information for the communication session. Telemetry circuitry 208 may be configured to change the advertising interval. For example, telemetry circuitry 208 may receive an indication of an advertising interval from external device 104. External device 104 and/or IMD 106 may reduce the advertising interval from a current advertising interval to reduce an amount of time for establishing a communication session. In contrast, external device 104 and/or IMD 106 may increase the advertising interval from a current advertising interval to reduce an amount of energy used for establishing the communication session.

IMD 106 may be configured to generate second information. For example, processing circuitry 210 may be configured to determine the second information based on one or more of a sensor output from IMD 106, motion information generated by an accelerometer of sensing circuitry 204, spacial information and/or posture information generated with an accelerometer of sensing circuitry 204, sleep information generated with sensing circuitry 204, a magnetic resonance imaging (MRI) signal generated by sensing circuitry 204, or a state of a connection between IMD 106 with external device 104 or another device of system 100.

According to the techniques of the disclosure, external device 104 may be configured to use sensor information detected by external device 104 to determine an advertising interval for communication between external device 104 and IMD 106. For example, external device 104 may configure telemetry circuitry 208 to advertise (e.g., wireless session information) at the determined advertising interval. Telemetry circuitry 208 may advertise the advertisement at the determined advertising interval. In this way, system 100 may help to reduce a time to initiate communication between IMD 106 to external device 104 when the user (e.g., patient 112, a caretaker of patient 112, or a clinician associated with patient 112) is likely to request the connection to help to improve the response time and usability of system 100 while also potentially reducing the communication energy drain when the communication is not likely to be needed (e.g., when patient 112 is sleeping).

In accordance with the techniques of the disclosure, IMD 106 may implement smart connectivity driving optimized longevity of power source 220 (e.g., a battery) and an optimized individual tailor-made user experience that reduces or even eliminates a connection latency of telemetry circuitry 208. Techniques described herein may help to allow IMD 106 to function to optimum performance levels exceling in patient experience while improving device longevity. Techniques described herein may help to allow patient 122 to use IMD 106 for a longer time, therefore reducing the risk of replacement surgeries.

Figure 3:
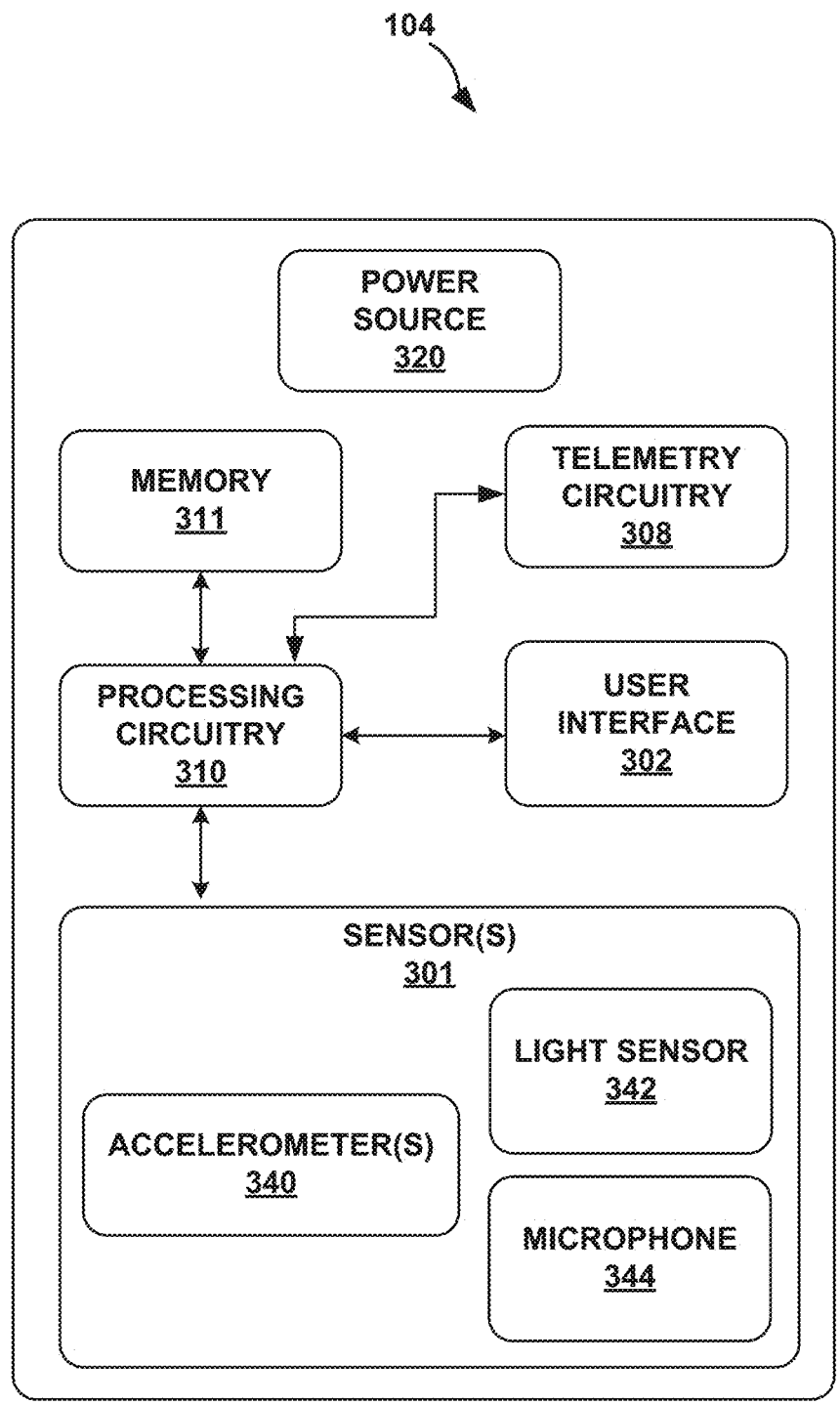
FIG. 3 is a block diagram of the external device of FIG. 1 for communicating with a medical device according to an example of the techniques of the disclosure.

FIG. 3 is a block diagram of the external device 104 of FIG. 1. Although external device 104 may generally be described as a hand-held device, external device 104 may be a larger portable device or a more stationary device. In addition, in other examples, external device 104 may be included as part of an external charging device or include the functionality of an external charging device. As illustrated in FIG. 3, external device 104 may include processing circuitry 310, memory 311, user interface 302, telemetry circuitry 308, and power source 320. Memory 311 may store instructions that, when executed by processing circuitry 310, cause processing circuitry 310 and external device 104 to provide the functionality ascribed to external device 104 throughout this disclosure. Each of these components, or modules, may include electrical circuitry that is configured to perform some or all of the functionality described herein. For example, processing circuitry 310 may include processing circuitry configured to perform the processes discussed with respect to processing circuitry.

In general, external device 104 comprises any suitable arrangement of hardware, alone or in combination with software and/or firmware, to perform the techniques attributed to external device 104, and processing circuitry 310, user interface 302, and telemetry circuitry 208 of IMD 106. In various examples, external device 104 may include one or more processors, which may include fixed function processing circuitry and/or programmable processing circuitry, as formed by, for example, one or more microprocessors, DSPs, ASICs, FPGAs, or any other equivalent integrated or discrete logic circuitry, as well as any combinations of such components. External device 104 also, in various examples, may include a memory 311, such as RAM, ROM, PROM, EPROM, EEPROM, flash memory, a hard disk, a CD-ROM, comprising executable instructions for causing the one or more processors to perform the actions attributed to them. Moreover, although processing circuitry 310 and telemetry circuitry 308 are described as separate modules, in some examples, processing circuitry 310 and telemetry circuitry 308 may be functionally integrated with one another. In some examples, processing circuitry 310 and telemetry circuitry 308 correspond to individual hardware units, such as ASICs, DSPs, FPGAs, or other hardware units. While telemetry circuitry 308 is described as being arranged within external device 104, in some examples, aspects of telemetry circuitry 308 (e.g., configuring a medical device to advertise at an advertising interval or initiating a communication session) may be performed by telemetry circuitry 308 external to external device 104 (e.g., in an intermediate device).

Memory 311 (e.g., a storage device) may store instructions that, when executed by processing circuitry 310, cause processing circuitry 310 and external device 104 to provide the functionality ascribed to external device 104 throughout this disclosure. For example, memory 311 may include instructions that cause processing circuitry 310 to obtain a parameter set from memory or receive a user input and send a corresponding command to IMD 106, or instructions for any other functionality. In addition, memory 311 may include a plurality of programs, where each program includes a parameter set that defines stimulation therapy.

User interface 302 may include a button or keypad, lights, a speaker for voice commands, a display, such as a liquid crystal (LCD), light-emitting diode (LED), or organic light-emitting diode (OLED). In some examples the display may be a touch screen. User interface 302 may be configured to display any information related to the delivery of stimulation therapy, identified patient behaviors, sensed patient parameter values, patient behavior criteria, or any other such information. User interface 302 may also receive user input. The input may be, for example, in the form of pressing a button on a keypad or selecting an icon from a touch screen.

One or more sensors 301 may include one or more accelerometers 340, a light sensor 342, and a microphone 344. For example, one or more accelerometers 340 may be configured to determine information indicating a movement of external device 104. Information may comprise one or more of an acceleration in an x-direction, acceleration in a y-direction, or an acceleration in a z-direction. The x-direction may be perpendicular to both the y-direction and the z-direction. While the example of FIG. 3 uses accelerometer 340, in some examples external device 104 may additionally, or alternatively, include a gyroscope that may detect the movement and/or generate motion information. Light sensor 342 may be configured to determine light information (e.g., an ambient light level of an environment detected by light sensor 342). Microphone 344 may be configured to determine sound information (e.g., an ambient sound level of an environment detected by microphone 344). For example, microphone 344 may detect speech (e.g., from patient 122 or a caretaker of patient 122).

Sensors 301 may generate first information. For example, processing circuitry 310 may be configured to determine the first information based on one or more of a first sensor signal from one or more of microphone 344, light sensor 342 (e.g., a camera or an optical sensor), accelerometer 340, a global positioning system (GPS), or a geo-fencing signal detected by sensors 301. In some examples, processing circuitry 310 may be configured to determine the first information based on a second sensor signal detected by a wearable device associated with external device 104, application information from an application operating on external device 104, a lock state signal indicating whether external device 104 is in an unlocked state or a locked state, a calendar event occurring at external device 104, a remote request received by external device 104, an establishment of a connection between external device 104 and an automobile, a user accessing an application associated with IMD 106 using external device 104, or an in-band sting received using a telemetry frequency of the connection between the medical device and the external device.

For example, microphone 344 may detect a sound level (e.g., loud sounds at night), which may be a trigger to initiate a communication session and/or to decrease an advertising interval. Processing circuitry 310 may determine that the detected sound levels identify an emergency situation where action may need to be taken (e.g., crashing, dog barking, sirens, smoke alarms). Microphone 344 could record sounds that are typically heard before patient 122 typically uses external device 104 to adjust something. For example, microphone 344 may record the sound of a shower turning on or a toilet flushing or an electric razor or a car starting, or a door opening/closing. Processing circuitry 310 may learn that behavior over time, and when that sound pattern is detected in the future processing circuitry 310 could start establishing communication and/or decrease an advertising rate without user input.

Similarly, light sensor 342 may detect light levels, which may be a trigger to initiate a communication session and/or to decrease an advertising interval. Processing circuitry 310 may determine that the detected light levels identify an emergency situation where action may need to be taken. Light sensor 342 could record light levels typically detected before patient 122 uses external device 104 to make an adjustment. For example, light sensor 342 may record the light level of lights turning on in the morning (e.g., a bedroom). For instance, processing circuitry 310 may learn when low light is detected that 30 minutes after that point patient 122 rarely programs external device 104. In this example, processing circuitry 310 may slow down the advertising rate for 30 minutes after light sensor 342 detects darkness. Processing circuitry 310 may learn that behavior over time, and when that light pattern is detected in the future, processing circuitry 310 could start establishing communication and/or decrease an advertising rate without user input. Combining inputs and patterns from accelerometer 340, microphone 344, and light sensor 342 may have even a stronger correlation, also likely including time.

Telemetry circuitry 308 may support wireless communication between IMD 106 and external device 104 under the control of processing circuitry 310. Telemetry circuitry 308 may also be configured to communicate with another computing device via wireless communication techniques, or direct communication through a wired connection. In some examples, telemetry circuitry 308 provides wireless communication via an RF or proximal inductive medium. In some examples, telemetry circuitry 308 includes an antenna, which may take on a variety of forms, such as an internal or external antenna.

Examples of local wireless communication techniques that may be employed to facilitate communication between external device 104 and IMD 106 include RF communication according to the 802.11 or Bluetooth specification sets (e.g., Classic Bluetooth, Bluetooth high speed and Bluetooth Low Energy (BLE) protocols) or other standard or proprietary telemetry protocols. In this manner, other external devices may be capable of communicating with external device 104 without needing to establish a secure wireless connection. While examples described herein may refer to connections as using the Bluetooth protocol for establishing a connection and using advertisements compliant with the Bluetooth protocol other known and future protocols may be used. For example, techniques described herein for establishing a connection between IMD 106 and external device 104 may be compliant with any RF communication protocol and/or may use any telemetry frequency.

Telemetry circuitry 308 may receive the advertising packet and connect with another device (e.g., medical device 106) using the received advertisement. The advertisement may include information on how to connect with the advertising device, such as, for example, one or more of: (1) media access control (MAC) addresses for the medical device and external device; (2) a real time-point in time for the transfer to start; (3) an indication of a starting frequency; (4) an indication of a hop set; (5) a connection interval; or (6) a connection latency. For example, telemetry circuitry 308 may establish a connection with medical device 106 using a starting frequency and hop set indicated by an advertisement broadcast (e.g., on a set of advertising channels) by medical device 106. In some examples, telemetry circuitry 308 may periodically output an advertisement at an advertising interval (e.g., less than 100 ms, 100 ms to 500 ms, 1 second, more than 1 second, etc.) with a random delay. In this example, other devices may connect with telemetry circuitry 308 using the advertisement output by telemetry circuitry 308.

In some examples, processing circuitry 310 of external device 104 may define the parameters of electrical stimulation therapy, stored in memory 311, for delivering adaptive DBS to patient 112. In one example, processing circuitry 310 of external device 104, via telemetry circuitry 308, issues commands to IMD 106 causing IMD 106 to deliver electrical stimulation therapy via electrodes 116, 118 via leads 114.

Telemetry circuitry 308 may be configured to initiate a communication session using advertisement. For example, telemetry circuitry 308 may receive (e.g., from telemetry circuitry 208) the advertisement at an advertising interval. The advertising interval may include a Bluetooth Low Energy advertising interval. The advertisement may comprise security information for a communication session and/or connection information for the communication session. For example, telemetry circuitry 308 may establish a Bluetooth communication session using security information for a communication session and/or connection information for the communication session advertised by IMD 106 at a Bluetooth Low Energy advertising interval. In some examples, processing circuitry 310 may be configured to preemptively initiate a connection with of IMD 106 based on one or more techniques described with respect to FIGS. 6-17.

Processing circuitry 310 may be configured to change the advertising interval of telemetry circuitry 208 of IMD 106. For example, processing circuitry 310 may determine an advertising interval for telemetry circuitry 208 based on sensor information detected by sensors 301. Examples of sensor information may include, for example, a movement of external device 104 detected by one or more accelerometers 340, light information detected by light sensor 342, sound information detected by microphone 344, whether external device 104 is configured in a do not disturb mode, whether external device 104 is configured in a locked screen mode or unlocked screen mode, or other sensor information. For example, processing circuitry 310 may increase the advertising interval of telemetry circuitry 208 of IMD 106 (e.g., from a baseline interval), i.e., such that the time between successive intervals is longer and advertisements are less frequency, when the motion information indicates a number of movements of external device 104 is less than a threshold. In some examples, processing circuitry 310 may be configured to change the advertising interval of telemetry circuitry 208 of IMD 106 based on one or more techniques described with respect to FIGS. 6-17.

Telemetry circuitry 308 may output an indication of the determined advertising interval to IMD 106. For example, telemetry circuitry 308 may establish a first communication session between telemetry circuitry 308 and external device 104 (e.g., telemetry circuitry 208) using the advertisement advertised by IMD 106. In this example, telemetry circuitry 308 may output, using the first communication session, an indication of the determined advertising interval to cause telemetry circuitry 208 of IMD 106 to communicate the advertisement at the determined advertising interval. Telemetry circuitry 308 may establish a second communication session between telemetry circuitry 208 of IMD 106 and telemetry circuitry 308 using the advertisement. For instance, after telemetry circuitry 308 outputs the indication of the determined advertising interval, telemetry circuitry 308 may terminate the first communication session. In this instance, telemetry circuitry 308 may establish a second communication session using the advertisement as advertised by telemetry circuitry 208 of IMD 106 at the determined advertising interval. For example, in response to a user input indicating a selection of at least one program parameter or a parameter adjustment, telemetry circuitry 308 may output, using the second communication session, an indication of information to cause the medical device to provide therapy using the at least one program parameter (e.g., an indication of the at least one program parameter, a parameter value, or an adjustment to a parameter value). As described in further details below, telemetry circuitry 308 may initiate a communication session before receiving the selection of the at least one program parameter. For instance, telemetry circuitry 308 may initiate the communication session based on a movement of external device 104 (see FIG. 6).

External device 104 and/or IMD 106 may reduce the advertising interval of telemetry circuitry 208 of IMD 106 from a current advertising interval, i.e., such that the time between successive advertising intervals is shorter and advertisements are more frequent, to reduce an amount of time for establishing a communication session. In contrast, external device 104 and/or IMD 106 may increase the advertising interval of telemetry circuitry 208 of IMD 106 from a current advertising interval to reduce an amount of energy used for establishing the communication session. In this way, system 100 may help to reduce a time to initiate communication between IMD 106 to external device 104 when the user (e.g., patient 112, a caretaker of patient 112, or a clinician associated with patient 112) is likely to request the connection to help to improve the response time and usability of system 100 while also potentially reducing the communication energy drain when the communication is not likely to be needed (e.g., when patient 112 is sleeping).

Figure 4:
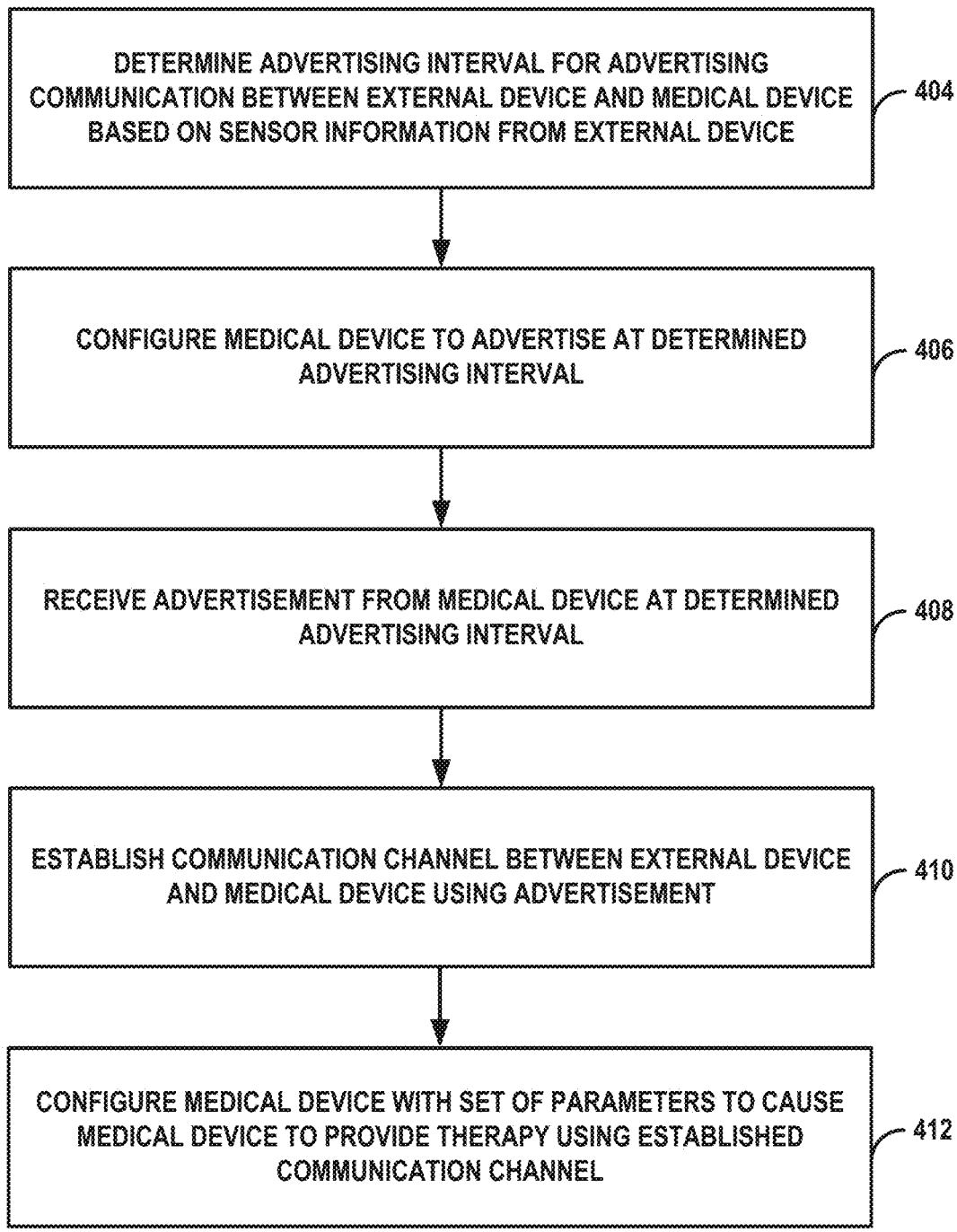
FIG. 4 is a flowchart illustrating an example operation for determining an advertising interval for communication of a medical device based on sensor information from an external device associated with the medical device according to an example of the techniques of the disclosure.

FIG. 4 is a flowchart illustrating an example operation for determining an advertising interval for communication of a medical device based on sensor information from an external device associated with the medical device according to an example of the techniques of the disclosure. External device 104 may determine an advertising interval for communication (e.g., an advertising communication) between external device 104 and the medical device based on sensor information from external device 104 (404). For example, external device 104 may determine a advertising interval for a wireless session between external device 104 and IMD 106 based on the movement of external device 104. In some examples, external device 104 may increase the advertising interval of telemetry circuitry 208 of IMD 106 from a baseline interval when the sensor information indicates a number of movements of the external device 104 are less than a threshold (e.g., a predetermined threshold) over a predetermined period of time. For instance, external device 104 may determine that the movement of external device 104 exceeds the threshold when the acceleration information indicates a number of movements of the external device 104 are greater than the threshold over a predetermined period of time. Similarly, external device 104 may determine that the movement of external device 104 does not exceeds the threshold when the acceleration information indicates a number of movements of the external device 104 is less than the threshold over a predetermined period of time.

In some examples, external device 104 may determine the advertising interval of telemetry circuitry 208 of IMD 106 based on the movement of external device 104 and based further on a time of day. For example, external device 104 may determine a period of time based on one or more previous communication sessions being established between external device 104 and IMD 106. External device 104 may apply machine learning to determine the period of time. In this example, external device 104 may determine the advertising interval of telemetry circuitry 208 of IMD 106 based on the movement of external device 104 and based further on a time of day being within the period of time. For instance, the period of time may correspond to when patient 112 is likely to be sleeping.

In some examples, external device 104 may determine the advertising interval telemetry circuitry 208 of IMD 106 based on the movement of external device 104 and based further on a motion of IMD 106. For example, external device 104 may determine that patient 112 is likely to be sleeping based on movement of IMD 106 being less than a patient motion threshold, e.g., being indicative of patient rest or sleep. In this example, external device 104 may determine to increase the advertising interval of telemetry circuitry 208 of IMD 106 based on the movement of external device 104 not exceeding the threshold and based further on the determination that the motion of IMD 106 is less than the patient motion threshold. External device 104 may determine to decrease the advertising interval based on the movement of external device 104 exceeding the threshold and based further on the determination that the motion of IMD 106 is greater than the patient motion threshold, e.g., being indicative of patient being awake or active.

External device 104 may determine the advertising interval telemetry circuitry 208 of IMD 106 based on the movement of external device 104 and based further on a position of patient 112. For example, external device 104 may determine to increase the advertising interval of telemetry circuitry 208 of IMD 106 based on the movement of external device 104 not exceeding the threshold and based further on the determination that the position of patient 112 comprises a supine position, e.g., being indicative of patient rest or sleep. External device 104 may determine to decrease the advertising interval based on the movement of external device 104 exceeding the threshold and based further on the determination that the position of patient 112 is not the supine position, e.g., being indicative of patient being awake or active.

External device 104 may be configured to determine the advertising interval of telemetry circuitry 208 of IMD 106 based on light information detected by external device 104. For example, external device 104 may determine that external device 104 is in a low light environment based on light information detected by light sensor 442 being less than a light threshold. In this example, external device 104 may determine to increase the advertising interval of telemetry circuitry 208 of IMD 106 based on the movement of external device 104 not exceeding the threshold and based further on the determination that external device 104 is in the low light environment, e.g., being indicative of patient rest or sleep.

External device 104 may be configured to determine the advertising interval of telemetry circuitry 208 of IMD 106 based on sound information detected by external device 104. For example, external device 104 may determine that external device 104 is in a low sound environment based on sound information detected by microphone 344 being less than a sound threshold. In this example, external device 104 may determine to increase the advertising interval of telemetry circuitry 208 of IMD 106 based on the movement of external device 104 not exceeding the threshold and based further on the determination that external device 104 is in the low sound environment. External device 104 may determine to decrease the advertising interval of telemetry circuitry 208 of IMD 106 based on the movement of external device 104 exceeding the threshold and based further on the determination that sound information detected by microphone 444 is greater than the sound threshold.

In some examples, external device 104 may determine the advertising interval of telemetry circuitry 208 of IMD 106 based on the movement of external device 104 and based further on whether external device 104 is configured in a do not disturb mode. For example, external device 104 may determine that patient 112 is likely to be sleeping based on external device 104 being configured in the do not disturb mode. In this example, external device 104 may determine to increase the advertising interval based on the movement of external device 104 not exceeding the threshold and based further on external device 104 being configured in the do not disturb mode. External device 104 may determine to decrease the advertising interval based on the movement of external device 104 exceeding the threshold and based further on external device 104 not being configured in the do not disturb mode.

External device 104 may determine the advertising interval of telemetry circuitry 208 of IMD 106 based on whether external device 104 has changed from a locked screen mode to an unlocked screen mode. For example, external device 104 may determine that patient 112 is likely to be sleeping based on external device 104 being operated in the locked screen mode. In this example, external device 104 may determine to increase the advertising interval based on the movement of external device 104 not exceeding the threshold and based further on external device 104 being operated in the locked screen mode. External device 104 may determine to decrease the advertising interval based on the movement of external device 104 exceeding the threshold and based further on external device 104 being operated in an unlocked screen mode.

External device 104 may configure the medical device to advertise at the determined advertising interval (406). For example, external device 104 may establish a first communication session between the medical device and external device 104 using the advertisement. In this example, external device 104 may output, using the first communication session, an indication of the determined advertising interval to cause the medical device to communicate the advertisement at the determined advertising interval. In this way, external device 104 may potentially reduce the communication energy drain when the communication is not likely to be needed (e.g., when the user is sleeping) while potentially helping to reduce a time to initiate communication between the medical device to the external device when the user (e.g., a patient, caretaker, or clinician) is likely to request the connection.

External device 104 may receive an advertisement advertised by the medical device at determined advertising interval (408). For example, IMD 106 may continuously advertise the advertisement at determined advertising interval. In this example, external device 104, may receive the advertisement advertised by IMD 106 in response to a determination to initiate a communication session (e.g., a Bluetooth session). For instance, external device 104 may determine to initiate the communication session in response to receiving a user input indicating a change in a set of parameters for therapy provided by IMD 106. In some examples, external device 104 may determine to initiate the communication session based on a movement of external device (see FIG. 5).

External device 104 may establish a communication session between the medical device and external device 104 using the advertisement (410). For example, external device 104 may establish a second communication session (e.g., after the first communication session has been ended) between IMD 106 and external device 104 using the advertisement advertised by IMD 106 at the determined advertising interval. External device 104 may configure the medical device with a set of parameters to cause the medical device to provide therapy using the established communication channel (412). For example, external device 104 may output, using the second communication session, an indication of at least one program parameter to cause IMD 106 to provide therapy using the at least one program parameter.

Figure 5:
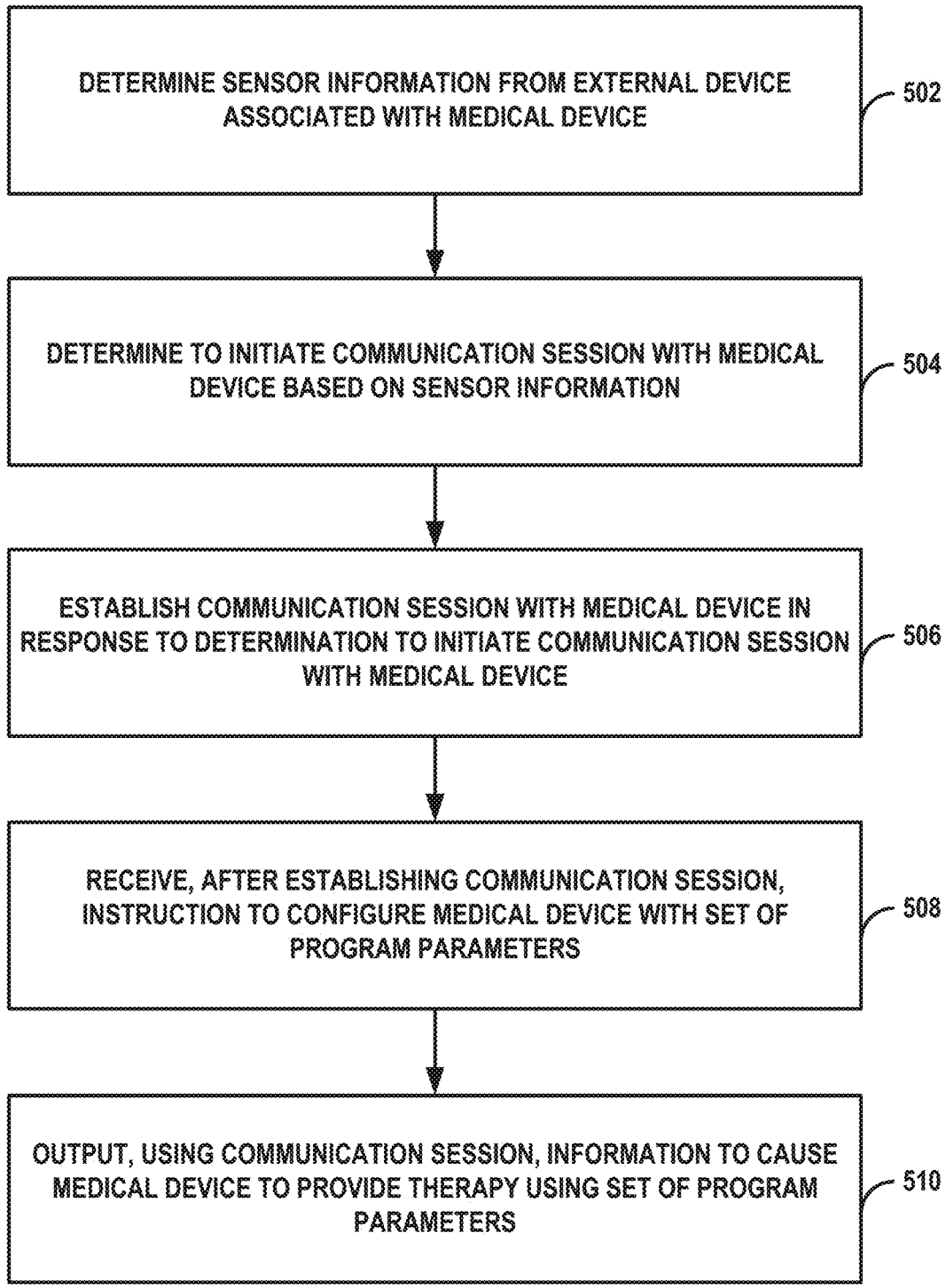
FIG. 5 is a flowchart illustrating an example operation for initiating a communication session for communication between an external device and a medical device based on sensor information from the external device according to an example of the techniques of the disclosure.

FIG. 5 is a flowchart illustrating an example operation for determining to initiate a communication session for communication between the external device and the medical device based on sensor information from external device 104 in accordance with techniques of the disclosure. External device 104 may determine sensor information from external device 104 associated with a medical device (502). For example, external device 104 may determine sensor information indicating one or more of a movement of external device 104, a light level at external device 104, or a sound level at external device 104. External device 104 may determine to initiate a communication session with the medical device based on the sensor information (504). For example, external device 104 may determine to initiate the communication session in response to a determination that the movement detected by one or more accelerometers 440 of external device 104 exceeds a threshold.

In some examples, external device 104 may determine to initiate the communication session based on the movement of external device 104 and based further on a time of day. For example, external device 104 may determine a period of time based on one or more previous communication sessions being established between the external device and the medical device. In this example, external device 104 may determine the advertising interval based on the movement of external device 104 and based further on a time of day being within the period of time. For instance, the period of time may correspond to when patient 112 is likely to be waking up.

In some examples, external device 104 may determine to initiate the communication session based on the movement of external device 104 and based further on one or more of an acceleration of IMD 106 or a position of patient 112. For example, external device 104 may determine that patient 112 is likely to be waking up based on one or more of an acceleration of IMD 106 or a position of patient 112. In this example, external device 104 may determine to initiate the communication session based on the movement of external device 104 exceeding the threshold and based further on the determination that patient 112 is likely to be waking up.

External device 104 may be configured to determine to initiate the communication session based on light information detected by external device 104. For example, external device 104 may determine that external device 104 is in a high light environment based on light information detected by light sensor 442 being greater than a light threshold. In this example, external device 104 may determine to initiate the communication session based on the movement of external device 104 exceeding the threshold and based further on the determination that external device 104 is in the high light environment.

External device 104 may be configured to determine to initiate the communication session based on sound information detected by external device 104. For instance, external device may be configured to determine to initiate the communication session based on both the movement of external device 104 and sound information detected by external device 104. For example, external device 104 may determine that external device 104 is in a high sound environment based on sound information detected by microphone 444 being greater than a sound threshold. In this example, external device 104 may determine to initiate the communication session based on the movement of external device 104 exceeding the threshold and based further on the determination that external device 104 is in the high sound environment.

In some examples, external device 104 may determine to initiate the communication session based on whether external device 104 is configured in a do not disturb mode. For example, external device 104 may determine that patient 112 is likely to be waking up based on the do not disturb mode being disabled. In this example, external device 104 may determine to initiate the communication session based on the movement of external device 104 exceeding the threshold and based further on the do not disturb mode being disabled.

External device 104 may determine to initiate the communication session based on whether external device 104 has changed from a locked screen mode to an unlocked screen mode. For example, external device 104 may determine that patient 112 is likely to be waking up based on external device 104 being changed from the locked screen mode to the unlocked screen mode. In this example, external device 104 may determine to initiate the communication session based on the movement of external device 104 exceeding the threshold and based further on external device 104 being changed from the locked screen mode to the unlocked screen mode.

In this way, external device 104 may preemptively initiate a communication session for communication between external device 104 and IMD 106 based on the sensor information from external device 104. For instance, external device 104 may determine to initiate the communication session in response to an increase in the movement of external device 104. In some examples, external device 104 may determine to initiate the communication session in response to the increase in the movement of the medical device and further in response to a determination that the movement has been above than a threshold for a predetermined period of time (e.g., 30 minutes). In this way, external device 104 may help to reduce an apparent time to initiate communication between the medical device to the external device when the user (e.g., a patient, caretaker, or clinician) is likely to request the connection to help to improve the response time and usability of the system while also potentially reducing the communication energy drain when the communication is not likely to be needed (e.g., when the user is sleeping).

External device 104 may establish the communication session with the medical device in response to the determination to initiate the communication session with the medical device (506). For example, external device 104 may establish the communication session between IMD 106 and external device 104 using advertisement advertised by IMD 106 at an advertising interval. That is, external device 104 may not instantly establish the communication session and external device 104 may scan with a radio for the next advertisement output by IMD 106 at the advertising interval. Moreover, in some examples, one or more advertisements may be missed by external device 104. As such, external device 104 may establish the communication session with a delay greater than the advertising interval.

External device 104 may receive, after establishing the communication session, information to cause the medical device to provide therapy using the at least one program parameter (508). For example, external device 104 may receive a user input indicating at least one program parameter to change a therapy provided to patient 112. External device 104 may output, using the communication session, an indication of information to cause the medical device to provide therapy using the at least one program parameter (510). IMD 106 may provide the therapy with the at least one program parameter in response to the indication of the at least one program parameter output by external device 104. In this way, external device 104 may initiate the communication session such that the delay in scanning for the advertisements output by IMD 106 starts when a user initially picks up external device 104 instead of when the user selects program parameters, which may help to improve the response time and usability of system 100.

Figure 6:
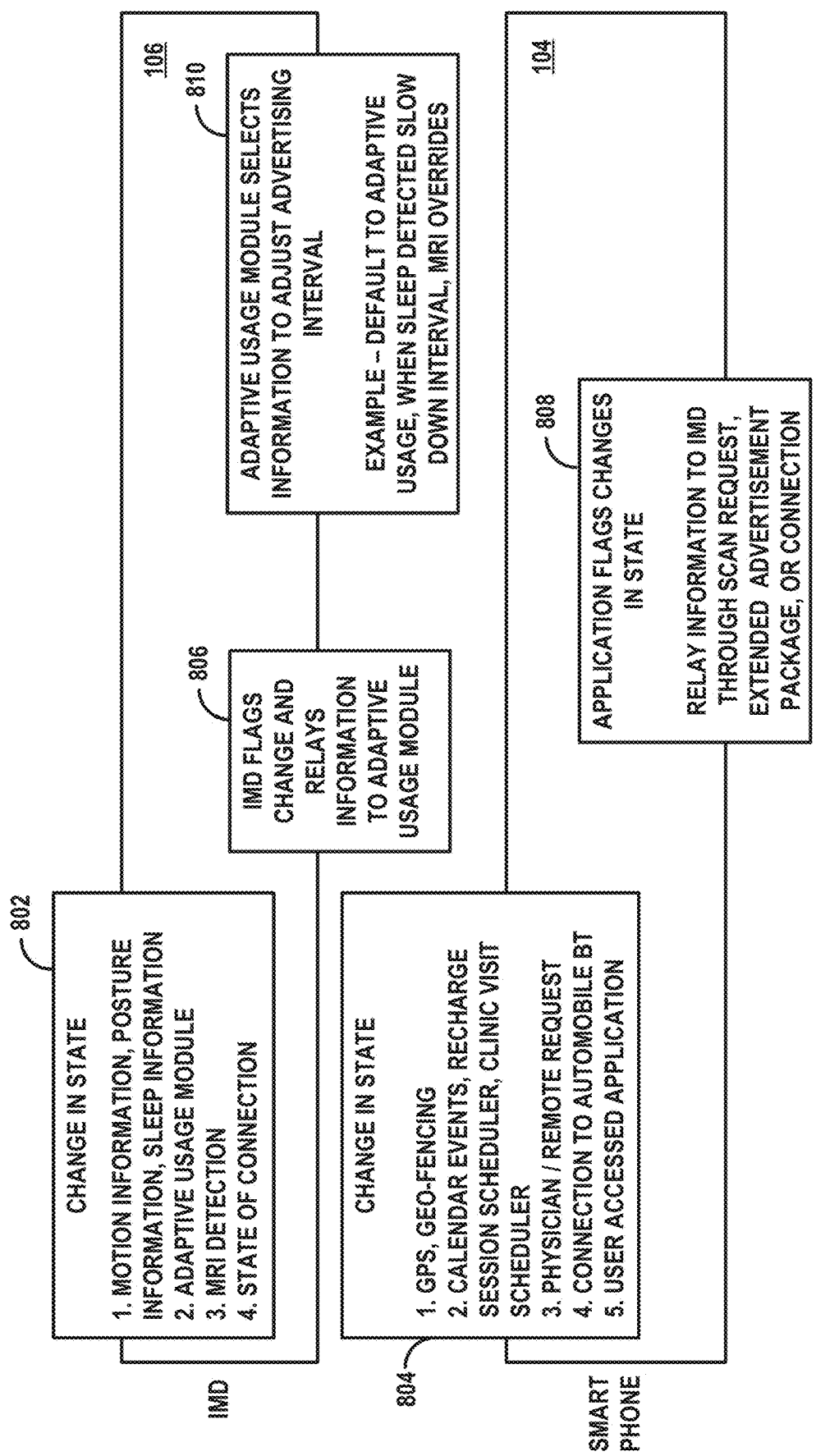
FIG. 6 is a conceptual diagram illustrating an example process for selecting connectivity information based on first sensor information and second sensor information according to an example of the techniques of the disclosure.

FIG. 6 is a conceptual diagram illustrating an example process for selecting connectivity information according to an example of the techniques of the disclosure. FIG. 6 is discussed with FIGS. 1-5 for example purposes only. In this example, IMD 106 may determine second information 802 based on one or more of motion information (e.g., an activity level for patient 102), posture information, sleep information, an adaptive usage module (e.g., a historical trend of establishing a connection), an MRI detection, or a state of connection of IMD 106 (e.g., connected to a charger or another device). External device 104, which is represented by a smart phone or simply "phone" in the example of FIG. 6, may determine first information 804 based on one or more of a GPS signal, a geo-fencing state (e.g., within a geo-fence or outside of a geo-fence), calendar events (e.g., a recharge session scheduler or clinic visit schedule), a physician/remote request, a connection to an automobile Bluetooth™ (e.g., a car), or a user accessed an application operating at external device 804.

IMD 106 may flag a change and relay information to an adaptive usage module (e.g., operating at IMD 106) (806). The adaptive usage module may be configured to select an advertising rate of the connection parameters based on historical information. Examples of connection parameters may include, for example, one or more of a connection interval, a packet size, or a physical layer/data rate. In this example, an application associated with IMD 106 may cause, when executed by processing circuitry operating at external device 104, external device 104 to relay first information 804 to IMD 106 through one or more of a scan request, an advertisement previously output by external device 104, or a previously established connection (808). As used herein, a scan request may refer to a functionality that broadcasts additional data than allowed in a single advertising packet. As used herein, a previously established connection may refer to a connection established using advertisements, pings, periodically scheduled, or another connection that is established before external device 104 determines connection parameters for a connection between medical device 106 and external device 104 and that is no longer established. IMD 106 may select, using an adaptive usage module, information to adjust an advertising interval (810). For example, an adaptive usage module of IMD 106 may set an advertising interval to a reduced level when patient 102 is sleeping. In this example, IMD 106 may override the advertising interval determined by the adaptive usage module in response to a sting (e.g., an MRI signal).

Figure 7:
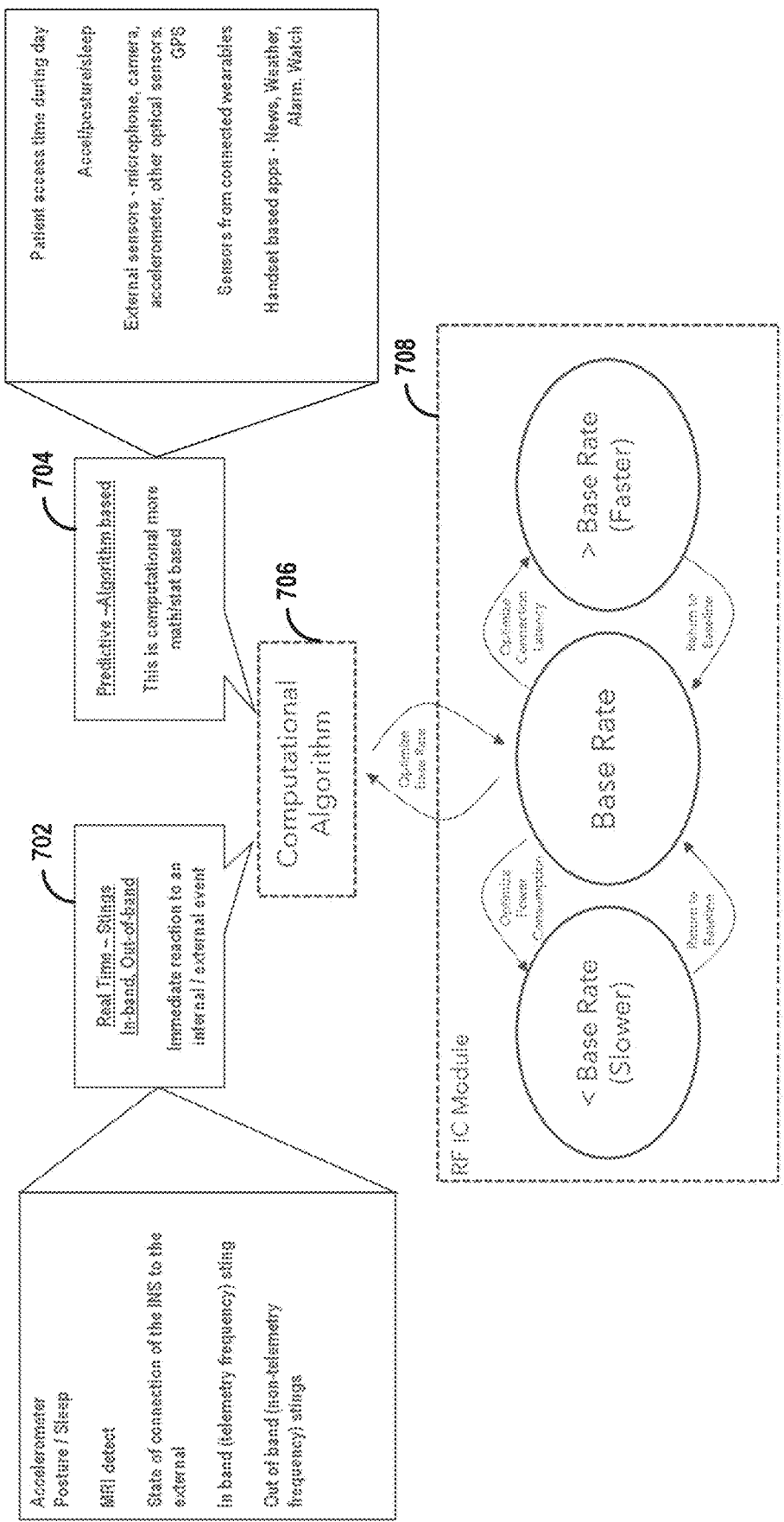
FIG. 7 is a conceptual diagram illustrating an example process for selecting an advertising rate according to an example of the techniques of the disclosure.

FIG. 7 is a conceptual diagram illustrating an example process for selecting an advertising rate according to an example of the techniques of the disclosure. The techniques illustrated in FIG. 7 may be applied for advertisement rate control and/or pre-emptive session initiation control. In this example, IMD 106 may set an advertisement rate faster than a base rate based on computational algorithm 706, which accepts real-time stings, in-band, and out-of-band information 702 and an output from predictive algorithm 704.

Real-time stings, in-band, and out-of-band information 702 may include one or more of accelerometer information, a posture state of patient 102, sleep information for patient 102, an MRI detection signal, a state of connection of IMD 106 to external device 104, an in-band sting (e.g., using a telemetry frequency), or an out-of-band sting (e.g., using a non-telemetry frequency). Predictive algorithm 704 may be computational more math and/or statistically based than real-time stings, in-band, and out-of-band information 702. An adaptive usage module may execute predictive algorithm 704. Predictive algorithm 704 may be configured to select the advertisement rate based on historical information. For example, predictive algorithm 704 may generate an output signal based on one or more of patient access time during a day, accelerometer information, a posture state of patient 102, sleep information for patient 102, signals from external sensors (e.g., a microphone, a camera, an accelerometer, other optical sensors, or a GPS), information from wearable devices, or handset based applications (e.g., news, weather, alarm, or watch). For example, computational algorithm 706 may cause the radio frequency (RF) integrated circuit (IC) module 708 (e.g., telemetry circuitry 208) to increase the advertisement rate from a base rate to optimize connection latency or reduce the advertisement rate from the base rate to optimize (e.g., reduce) power consumption. As used herein a sting (e.g., an in-band sting or an out-of-band sting) may refer to a burst or a patterned burst for communication. Stinging (e.g., out-of-band stinging) may not necessarily include advertisements or handshaking.

For example, IMD 106, external device 104, or another device (e.g., a cloud) may execute computation algorithm 706 using one or more of implant-based inputs and/or sensors detected by IMD 106, external sensors (e.g., sensors 301, sensors of a wearable device, or other sensors external to IMD 106), handset based applications (e.g., executed by external device 104), an in-band (e.g., telemetry frequency) sting, an out-of-band (e.g., non-telemetry frequency) sting, or machine learning and/or artificial intelligence that is patient specific. Examples of implant based inputs and/or sensors may include one or more of accelerometer information detected by IMD 106, a posture state of patient 102 determined by IMD 106, sleep information for patient 102 determined by IMD 106, an MRI detection signal, or a state of connection of IMD 106 to external device 104. For example, IMD 106 may use the sleep information and/or acceleration information to turn the advertisements OFF or to a relatively low rate to save battery on IMD 106. In some examples, a fall detector of IMD 106 may connect immediately and contact emergency services (e.g., implemented in a previous wearable).

Examples of external sensors may include one or more of a microphone (e.g., detecting patient 102 talking), a camera, an accelerometer, other optical sensors, or a GPS arranged on external device 104 and/or a wearable device. Sensors from connected wearable devices (e.g., a watch, other connected instruments) may include, for example, one or more of a temperature sensor or a pressure sensor. Examples of handset based applications may include news applications, weather applications (e.g., which may output a pressure, humidity, and/or temperature), an alarm, or a watch, as well as unlocking the phone/handset (e.g., external device 104). Examples of an in-band (e.g., telemetry frequency) sting may include flags or signals indicating to maximize an advertisement rate for a connection type (e.g., a Bluetooth™ connection) that uses an existing connection of the same connection type (e.g., a same telemetry frequency).

In contrast, examples of an out-of-band (e.g., non-telemetry frequency) sting may include flags or signals indicating to maximize an advertisement rate for a connection type (e.g., a Bluetooth™ connection) or preemptively initiate a connection of the connection type using an existing connection of a different connection type (e.g., a non-telemetry frequency). A telemetry frequency may correspond to a high frequency or radio frequency, which may be a radiofrequency established via Bluetooth, Wi-Fi, Near-Field Communication (NFC), or MICS, for example. A non-telemetry frequency may correspond to a different type of frequency or a different mode of communication (e.g., touching, vibrations, magnetic fields, and/or electric fields). Out-of-band (e.g., non-telemetry frequency) stings may include an energy or indication. Examples of out-of-band (e.g., non-telemetry frequency) stings may include ultrasound, telecoil, inductive telemetry, or a magnetic field (e.g., detecting a Hall effect). IMD 106 may use an external sting to increase an advertising rate from nominal to an ideal connection rate (e.g., a relatively high connection rate). Stinging (e.g., out-of-band stinging) may not necessarily include advertisements or handshaking. For instance an out-of-band (e.g., non-telemetry frequency) sting may include phone vibrations (e.g., modulated) and/or a tap on the body as detected by an accelerometer of the IMD 106.

Predictive algorithm 704 may apply machine learning and/or patient specific artificial intelligence. Inputs to the machine learning and/or patient specific artificial intelligence may include, for example, one or more of a patient access time during a day, a geolocation, patient fob access, or a timing profile when a phone connects (e.g., a heat map of time during the day). For example, predictive algorithm 704 may determine a target connect time to occur when patient 102 is talking to external device 104 between 8-9 AM based on the information from the instrument. Predictive algorithm 704 may be implemented on external device 104 or another device to reduce power consumption on IMD 106. However, in some examples, predictive algorithm 704 may be implemented on IMD 106.

Figure 8:
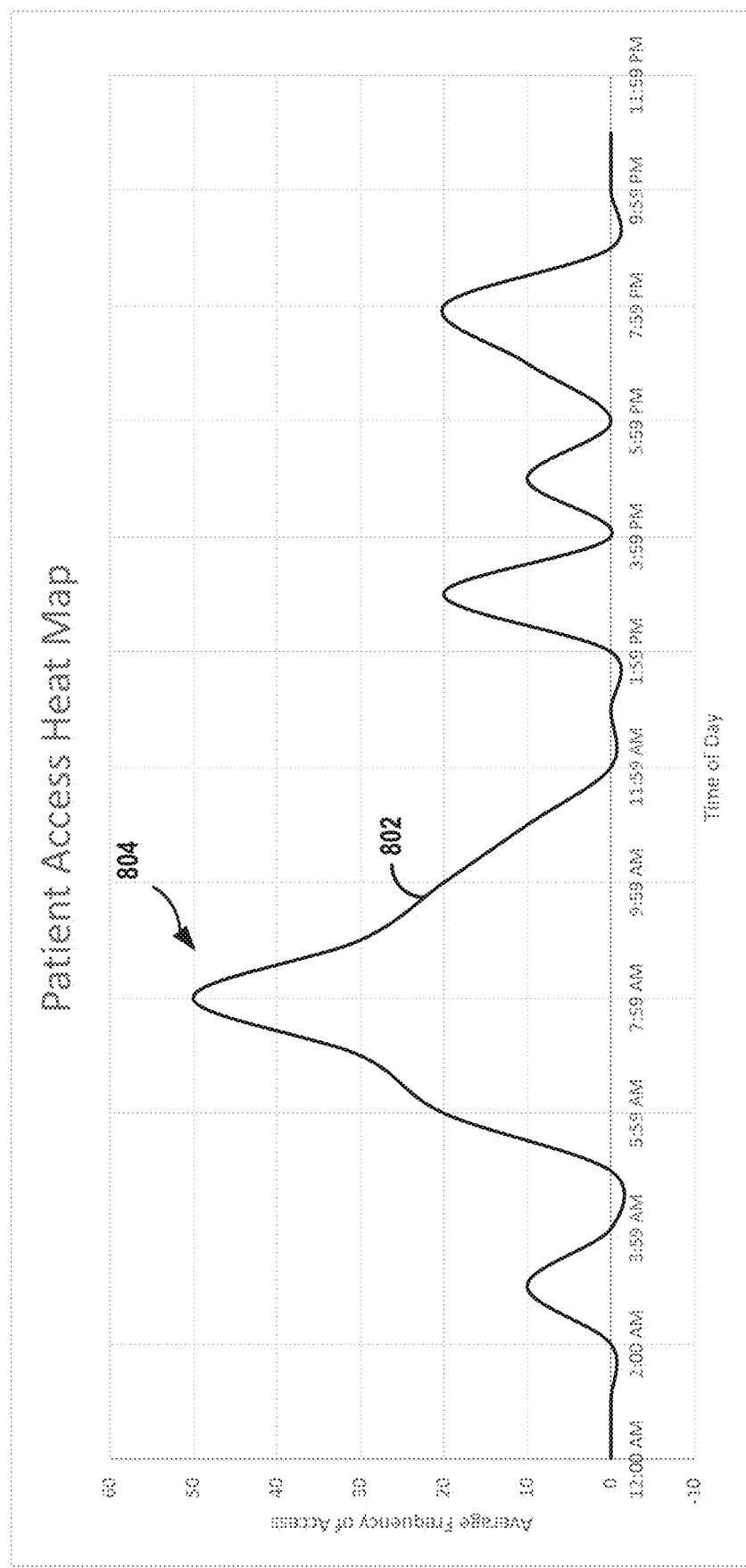
FIG. 8 is a chart illustrating an example patient access heat map for selecting an advertising rate according to an example of the techniques of the disclosure.

FIG. 8 is a chart illustrating an example patient access heat map for selecting an advertising rate according to an example of the techniques of the disclosure. FIG. 8 is discussed with FIGS. 1-7 for example purposes only. FIG. 8 may be an example of a user usage timeline map. The abscissas axis of FIG. 8 represents a time of day and the ordinate axis of FIG. 8 represents an average frequency of access. In the example of FIG. 8, predictive algorithm 704 may determine that patient 102 is likely to access IMD 106 during peak 804 (e.g., 6 AM to 11 AM). Accordingly, IMD 106 may be configured to increase an advertising rate during peak 804 or preemptively initiate a connection with external device 104.

Figure 9:
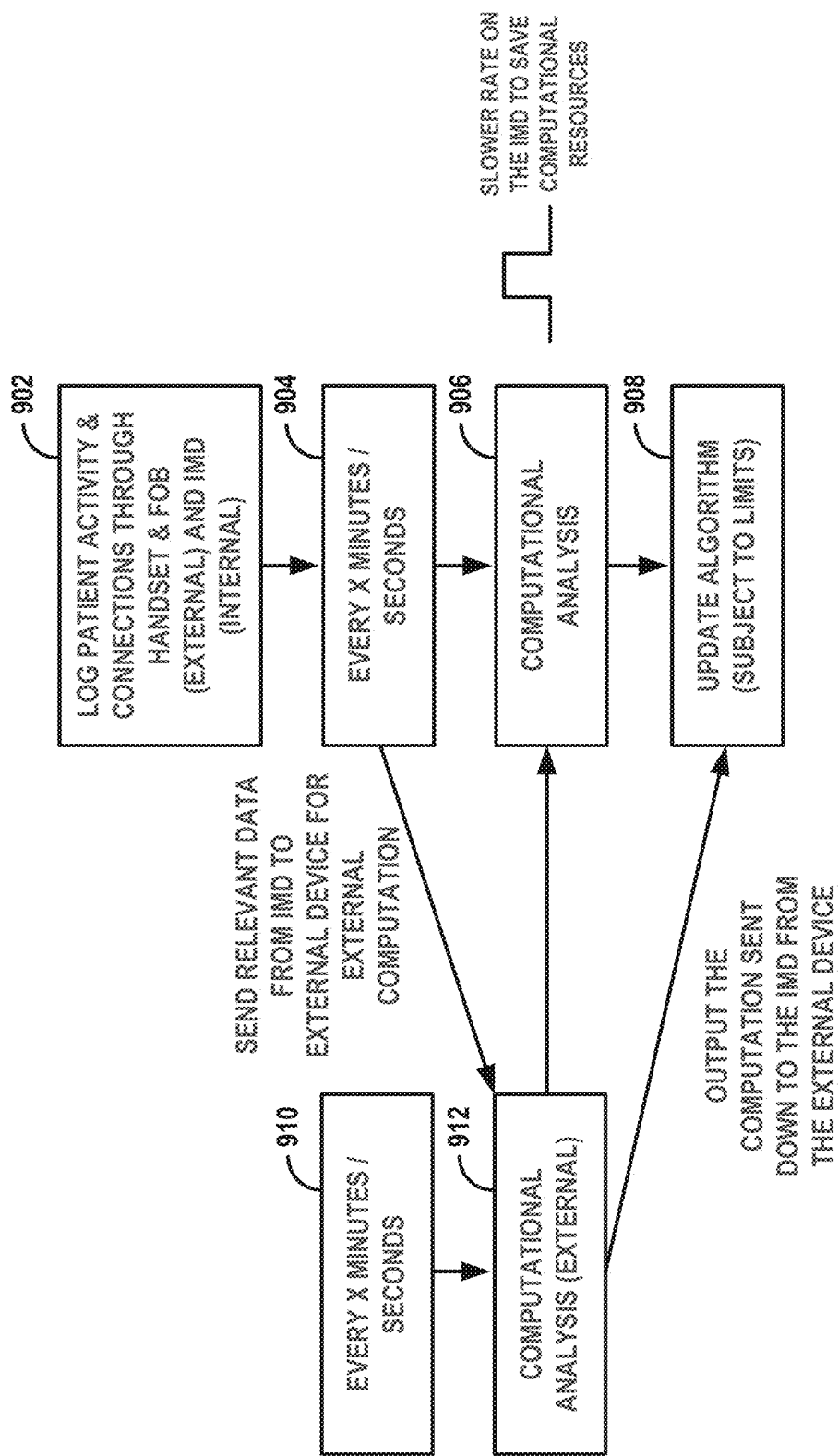
FIG. 9 is a conceptual diagram illustrating an example process for both external and internal computation analysis for selecting an advertising rate according to an example of the techniques of the disclosure.

FIG. 9 is a conceptual diagram illustrating an example process for both external and internal computation analysis for selecting an advertising rate according to an example of the techniques of the disclosure. FIG. 9 is discussed with FIGS. 1-8 for example purposes only. For example, IMD 106 may log patient activity and connection through a handset and fob (external) and IMD 106 (902). In this example, every X minutes or X seconds (904), IMD 106 may send relevant data to external device 104 for external computation and perform a computational analysis (906) to determine an advertisement rate (e.g., slower rate to save computational resources). Every X minutes or X seconds (910), external device 104 may perform a computational analysis (912) to determine an advertisement rate and output a result of the computation to IMD 106. IMD 106 may update the algorithm based on the result received from external device 104 (908).

Figure 10:
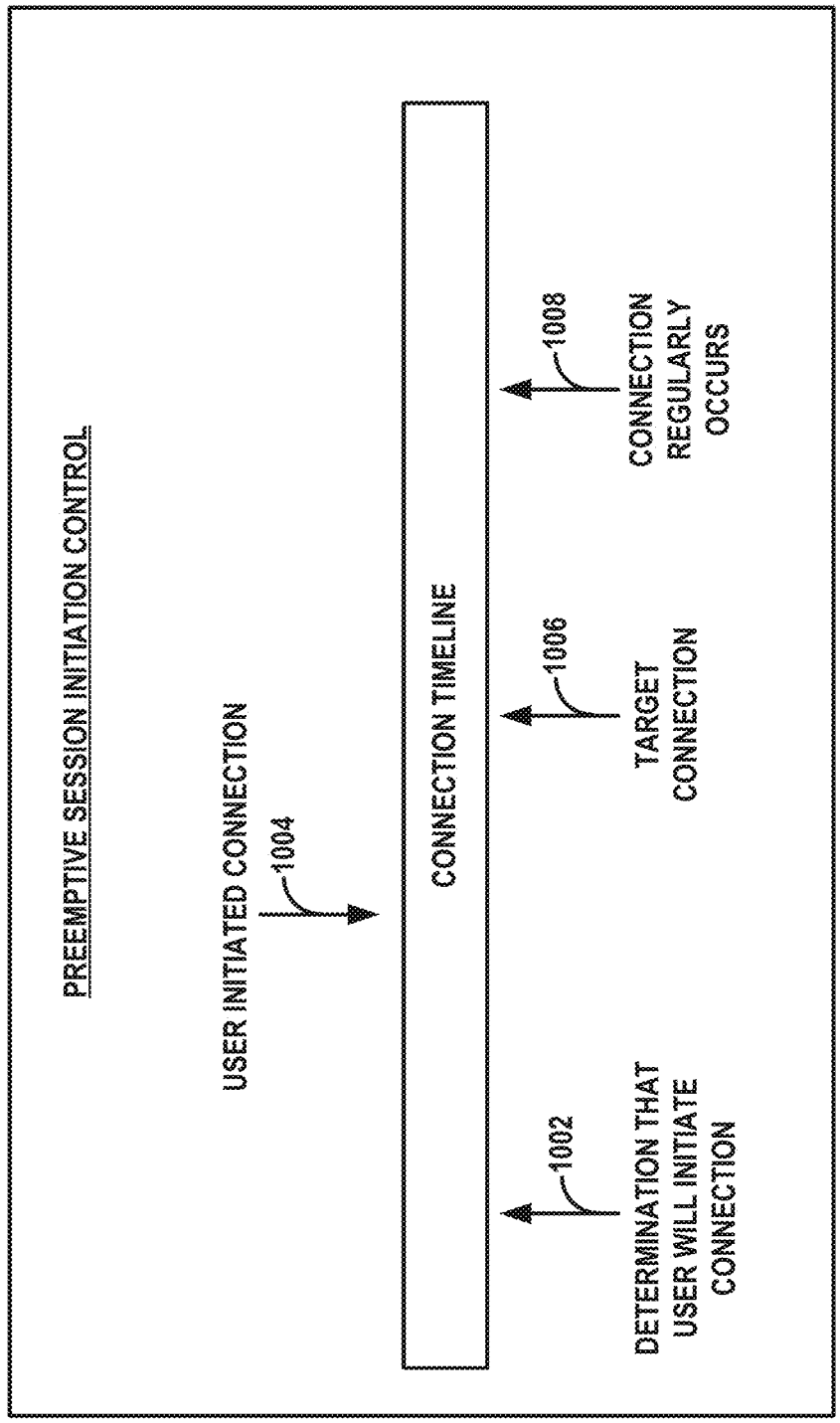
FIG. 10 is a conceptual diagram illustrating an example process for a preemptively initiation a communication session according to an example of the techniques of the disclosure.
Figure 11A:
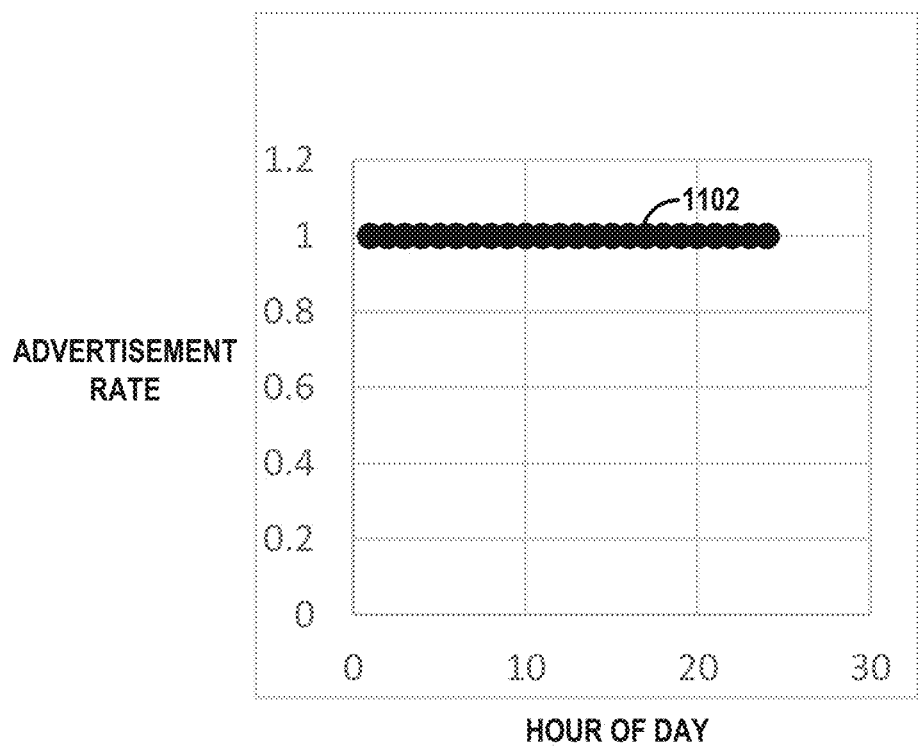
FIGS. 11A-11H are charts illustrating an example change in advertising rates for a time of day according to an example of the techniques of the disclosure.
Figure 11B:
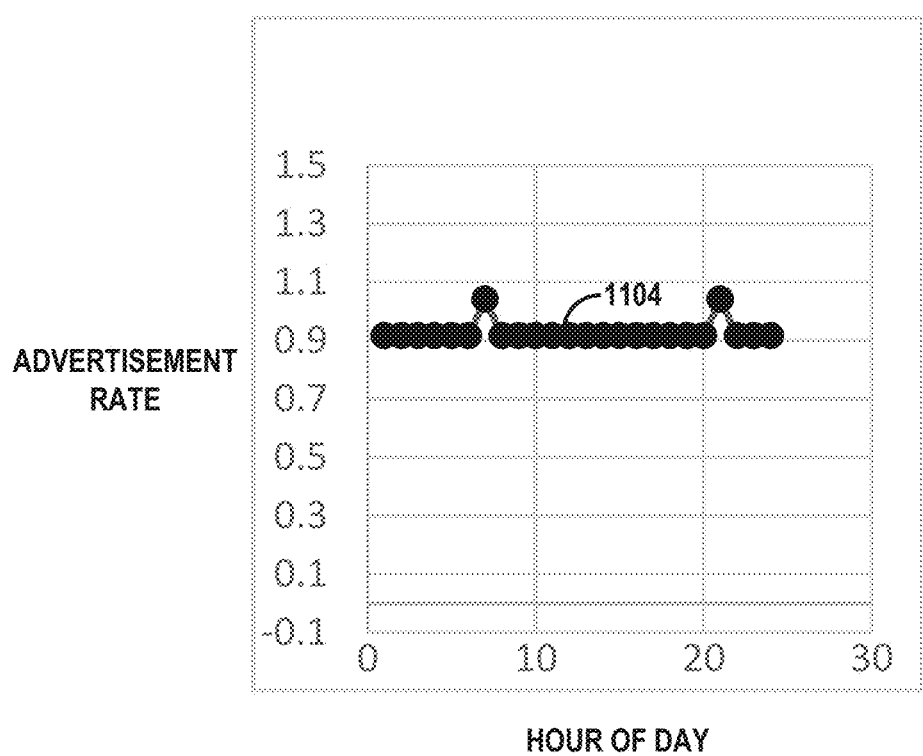
Figure 11C:
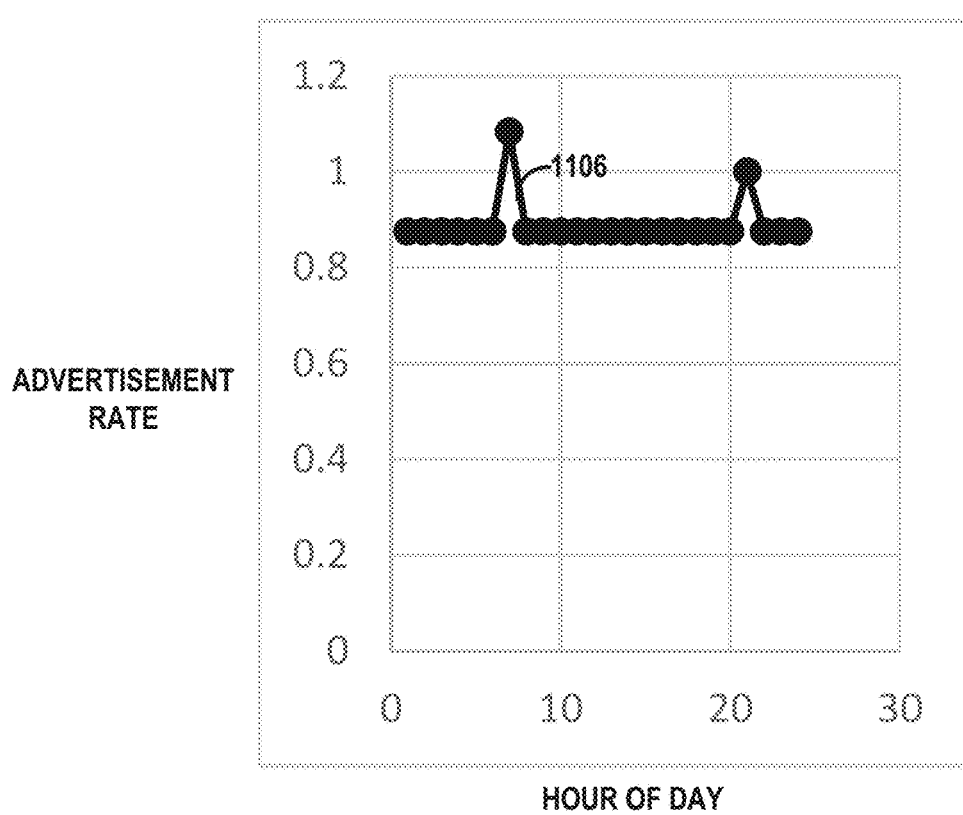
Figure 11D:
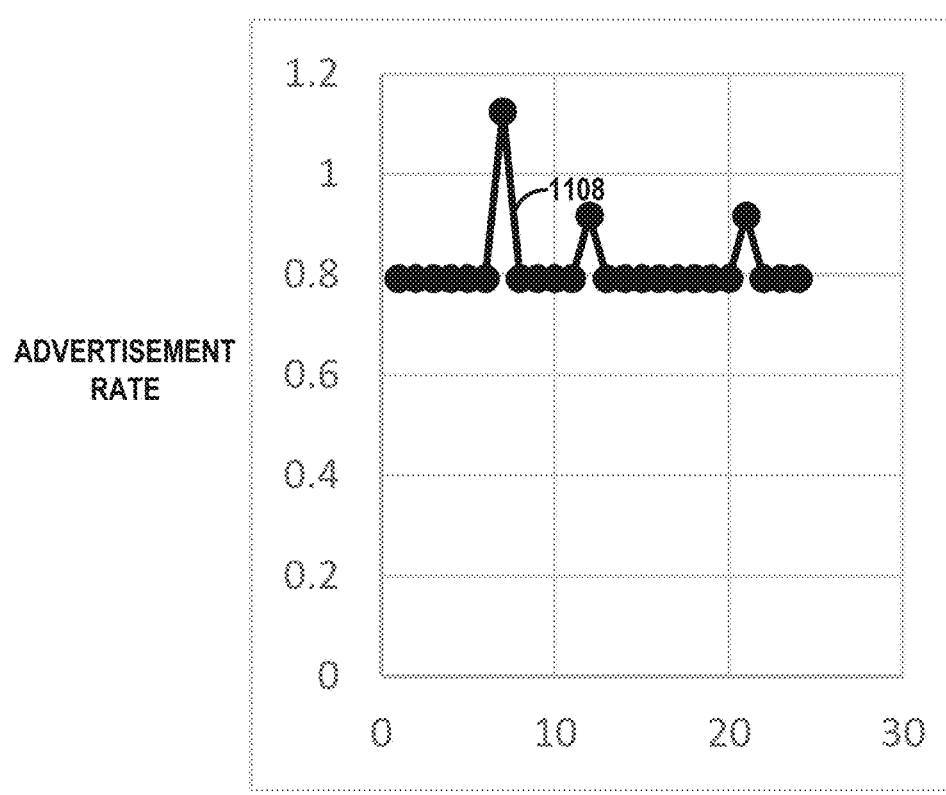
Figure 11E:
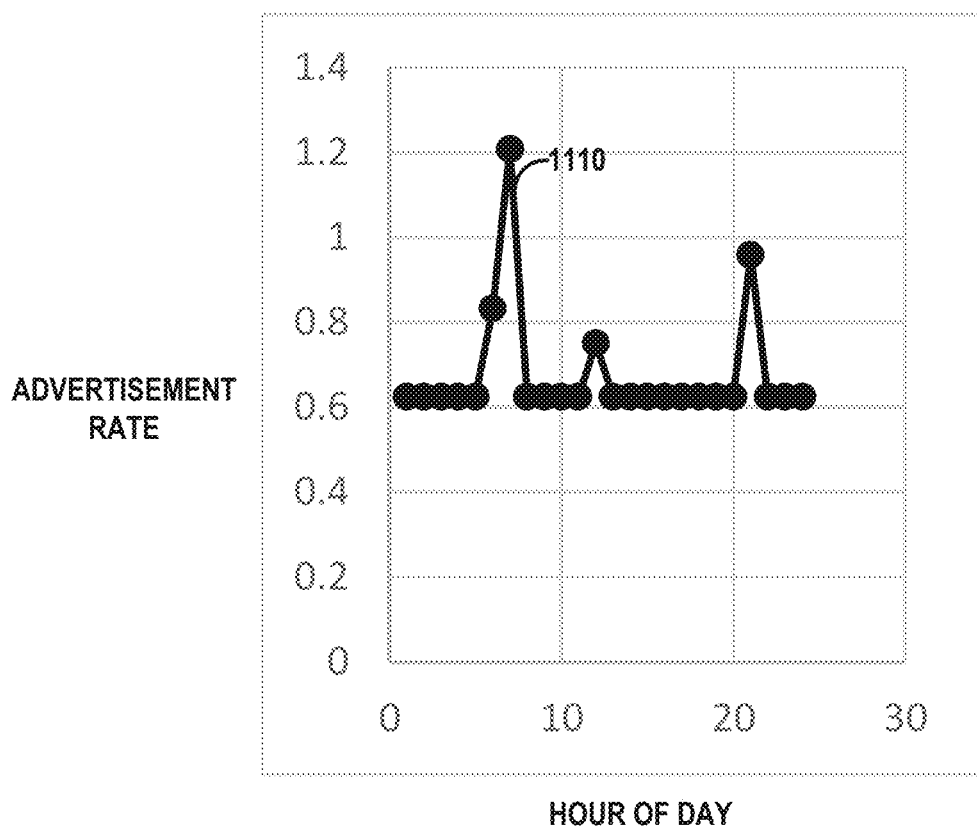
Figure 11F:
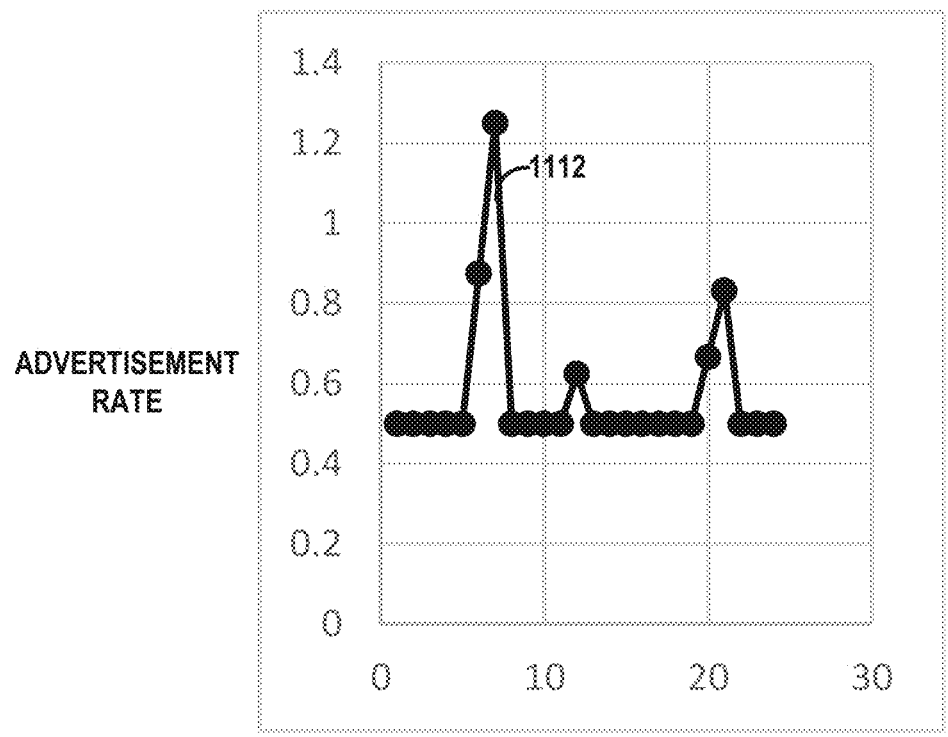
Figure 11G:
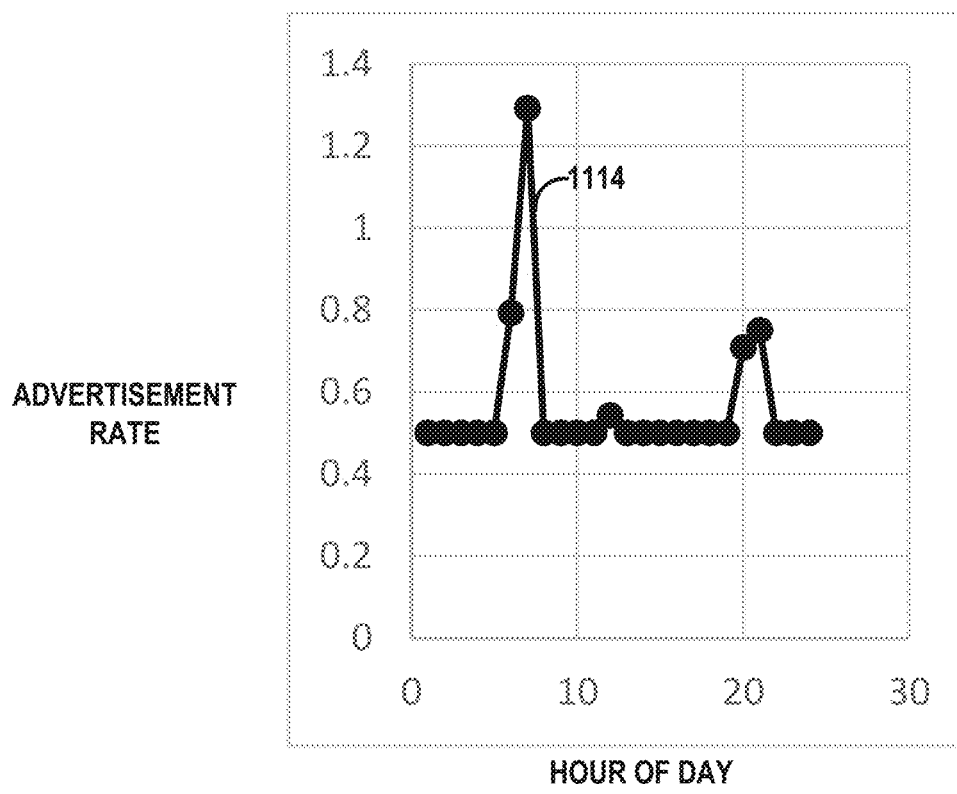
Figure 11H:
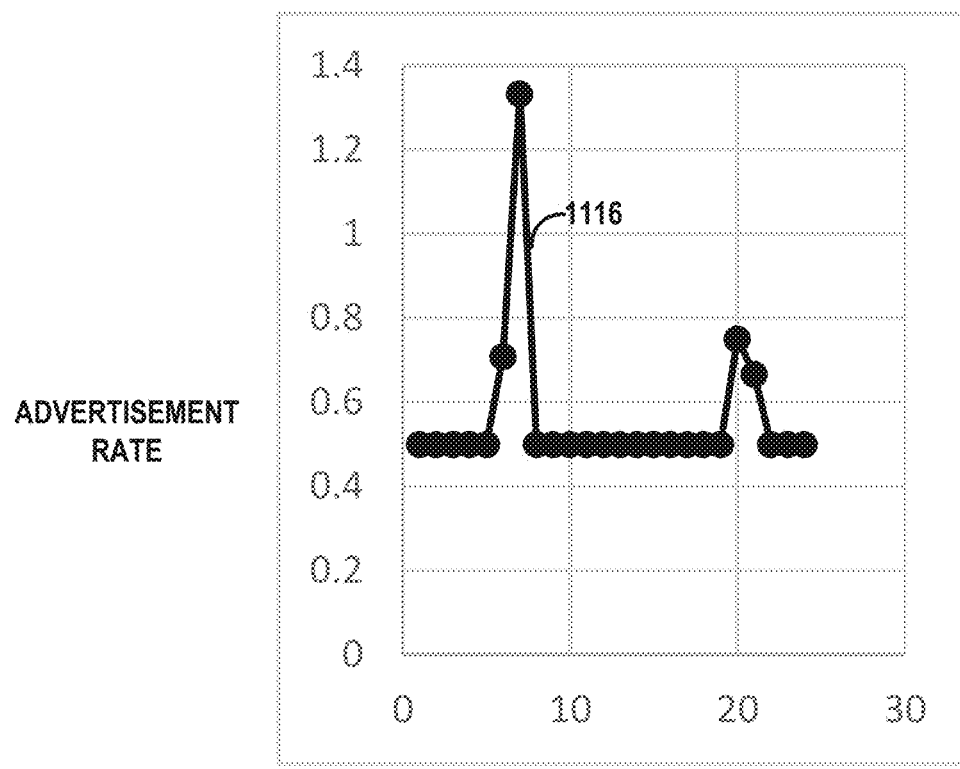

FIG. 10 is a conceptual diagram illustrating an example process for a preemptively initiation a communication session according to an example of the techniques of the disclosure. FIG. 10 is discussed with FIGS. 1-9 for example purposes only. In the example of FIG. 10, at time 1002, external device 104 may determine that a user is likely to initiate a connection. In this example, external device 104 may preemptively initiate, at time 1002, a connection (e.g., a wireless connection) with IMD 106 to establish the connection at target connection 1006. In this example, at time 1004, a user initiated a connection on external device 104. However, as external device 104 preemptively initiated the connection at time 1002, external device 104 may not take an action to establish the connection, which would have occurred at time 1008. At time 1006, external device 104 establishes the connection for the user, which may appear faster and more responsive to the user than waiting to initiate the connection at time 1004 and establishing the connection at time 1008.

FIGS. 11A-11H are charts illustrating an example change in advertising rates for a time of day according to an example of the techniques of the disclosure. FIGS. 11A-11H are discussed with FIGS. 1-10 for example purposes only. The abscissas axis of FIGS. 11A-11H represent a time of day and the ordinate axis of FIGS. 11A-11H represent a normalized advertisement rate 1102 for day 1 (e.g., an initial configuration), a normalized advertisement rate 1104 for day 2, a normalized advertisement rate 1106 for day 3, a normalized advertisement rate 1108 for day 4, a normalized advertisement rate 1110 for day 5, a normalized advertisement rate 1112 for day 6, a normalized advertisement rate 1114 for day 7, and a normalized advertisement rate 1116 for day 8. In the example of FIGS. 11A-11H, external device 104 and/or IMD 106 may use the normalized advertisement rate 1116 for day 8 as an input to computational algorithm 706 to modify an advertisement rate and/or determine a target connection time. As used herein, a target connection time may refer to a time when an advertisement has been received and processed and a connection between two devices has been established such that communication of data between the devices may occur.

Figure 12:
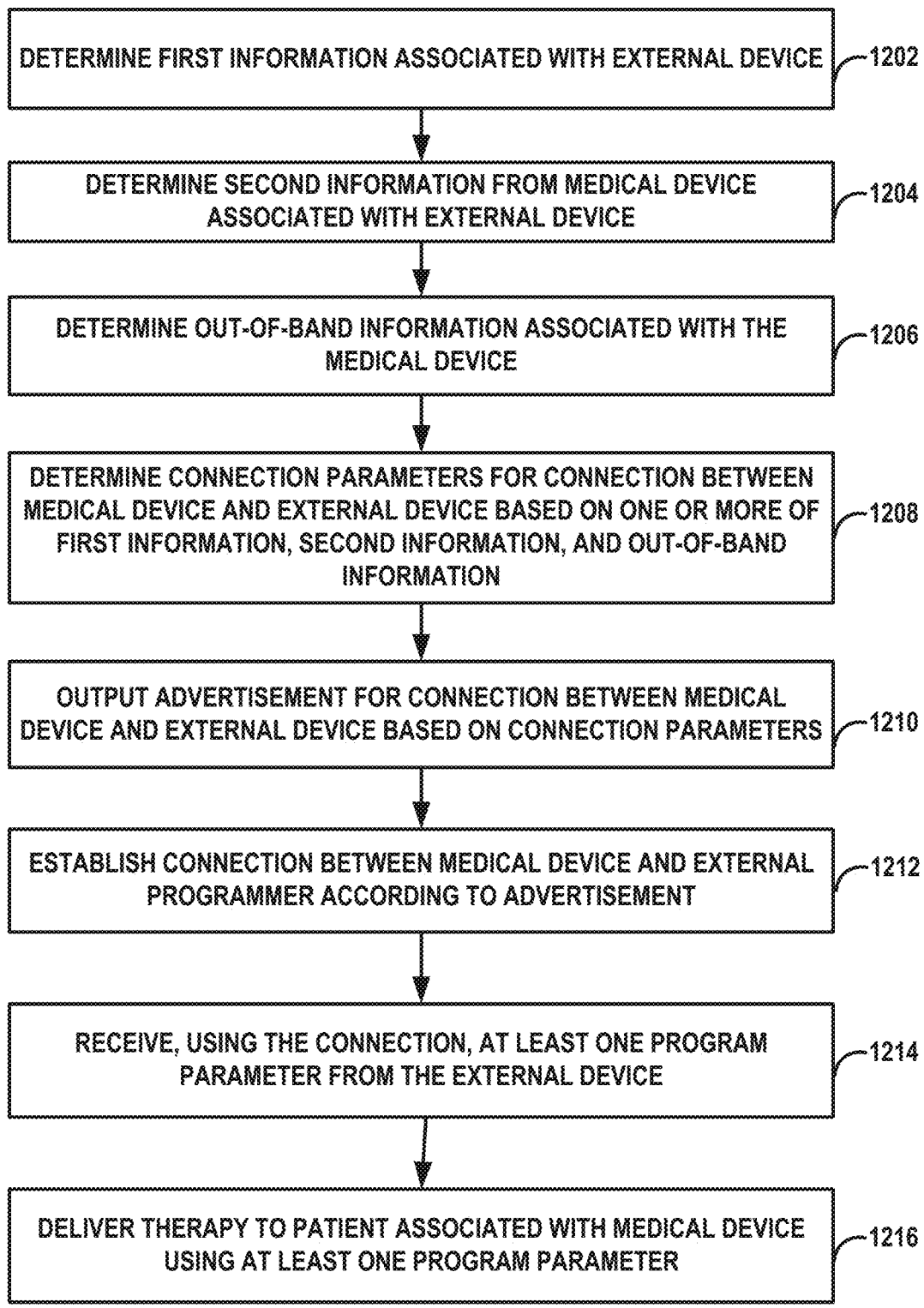
FIG. 12 is a flowchart illustrating an example operation for determining connection parameters according to an example of the techniques of the disclosure.

FIG. 12 is a flowchart illustrating an example operation for determining connection parameters based on sensor information according to an example of the techniques of the disclosure. FIG. 12 is discussed with FIGS. 1-10, 11A-11H for example purposes only. IMD 106 may determine first information associated with external device 104 (1202). For example, an application associated with IMD 106 may cause, when executed by processing circuitry operating at external device 104, external device 104 to relay first information to IMD 106 through one or more of a scan request, an advertisement package, or a wireless connection. For example, processing circuitry 310 may be configured to determine the first information based on one or more of a first sensor signal from one or more of microphone 344, light sensor 342 (e.g., a camera or an optical sensor), accelerometer 340, a GPS signal, or a geo-fencing signal detected by sensors 301. In some examples, processing circuitry 310 may be configured to determine the first information based on a second sensor signal detected by a wearable device associated with external device 104, application information from an application operating on external device 104, a lock state signal indicating whether external device 104 is in an unlocked state or a locked state, a calendar event occurring at external device 104, a remote request received by external device 104, an establishment of a connection between external device 104 and an automobile, a user accessing an application associated with IMD 106 using external device 104, or an in-band sting received using a telemetry frequency of the connection between the medical device and the external device.

IMD 106 may determine second information from a medical device (1204). For example, processing circuitry 210 may be configured to determine the second information based on one or more of a sensor output from IMD 106, motion information generated by an accelerometer of sensing circuitry 204, posture information generated with an accelerometer of sensing circuitry 204, sleep information generated with sensing circuitry 204, a magnetic resonance imaging (MRI) signal generated by sensing circuitry 204, or a state of a connection between IMD 106 with external device 104 or another device of system 100.

IMD 106 may determine an out-of-band sting associated with the medical device (1206). For example, IMD 106 may determine whether an out-of-band sting has occurred, where an out-of-band sting may include one or more of detecting ultrasound by the medical device, detecting a telecoil induction device by the medical device, detecting a magnetic field (e.g., a Hall effect) by the medical device, detecting a vibration of external programmer by the medical device, detecting, by the medical device, or a tap on a body of a patient associated with the medical device IMD 106 may determine connection parameters for a connection between the medical device and the external device based on one or more of the first information detected by external device 104, the second information detected by the medical device, or the out-of-band information (1208). For example, IMD 106 may apply computational algorithm 706 to the first information detected by external device 104, the second information detected by the medical device, and the out-of-band information to generate an advertising rate.

IMD 106 may output an advertisement for a connection between the medical device and the external device based on the connection parameters (1210). For example, IMD 106 may output the advertisement according to an advertising rate specified in the connection parameters. IMD 106 may establish the connection between the medical device and external programmer according to the advertisement (1212). For example, external device 104 may establish the connection using information (e.g., frequency hop information) specified in the advertisement. IMD 106 may receive, using the connection, at least one program parameter from external device 104 (1214) and deliver therapy to patient 102 using the at least one program parameter (1216).

Figure 13:
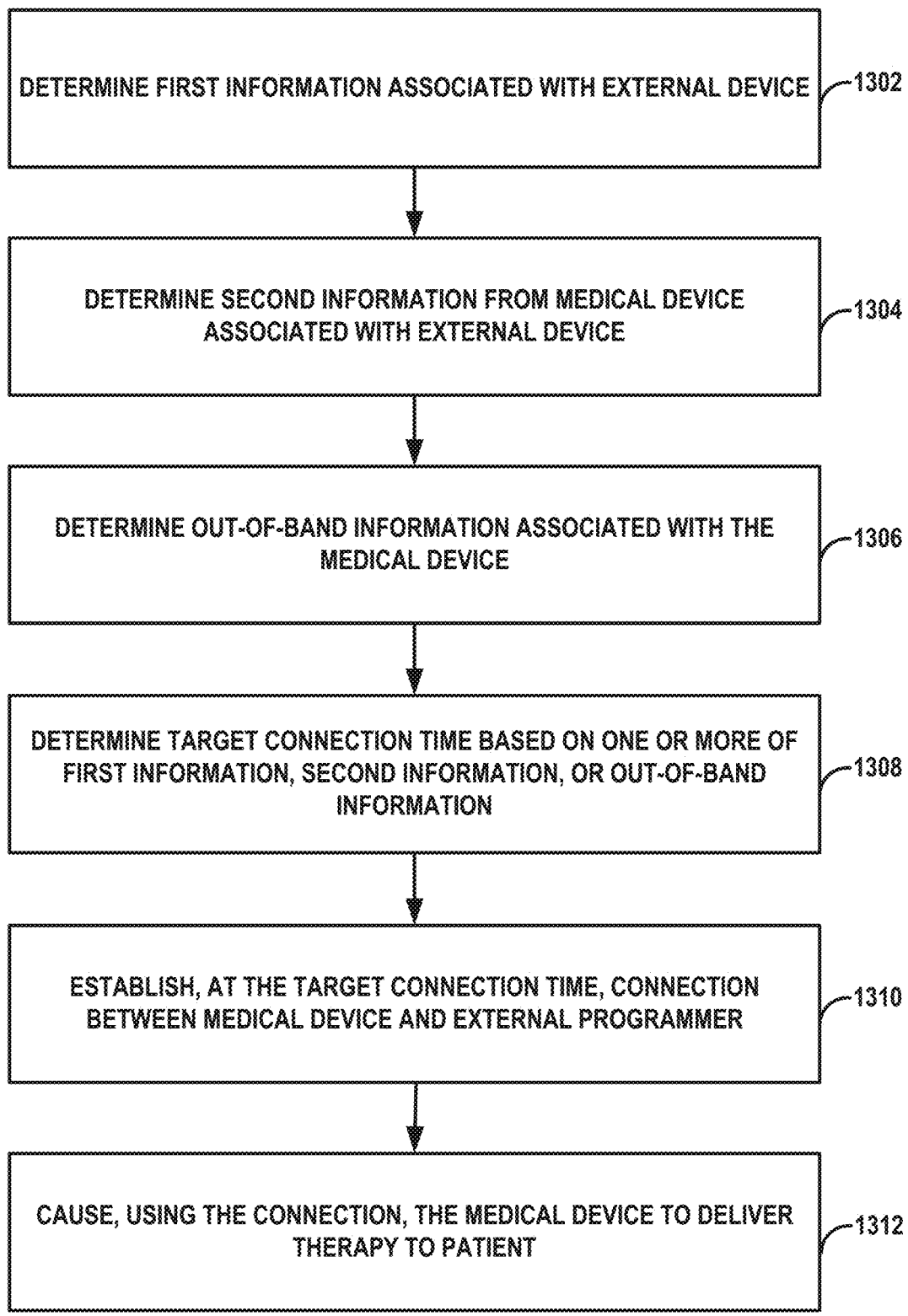
FIG. 13 is a flowchart illustrating an example operation for preemptively establishing a connection according to an example of the techniques of the disclosure.

FIG. 13 is a flowchart illustrating an example operation for preemptively establishing a connection based on sensor information according to an example of the techniques of the disclosure. FIG. 13 is discussed with FIGS. 1-10, 11A-11H, 12 for example purposes only. External device 104 may determine first information associated with external device 104 (1302). For example, processing circuitry 310 may be configured to determine the first information based on one or more of a first sensor signal from one or more of microphone 344, light sensor 342 (e.g., a camera or an optical sensor), accelerometer 340, a GPS signal, or a geo-fencing signal detected by sensors 301. In some examples, processing circuitry 310 may be configured to determine the first information based on a second sensor signal detected by a wearable device associated with external device 104, application information from an application operating on external device 104, a lock state signal indicating whether external device 104 is in an unlocked state or a locked state, a calendar event occurring at external device 104, a remote request received by external device 104, an establishment of a connection between external device 104 and an automobile, a user accessing an application associated with IMD 106 using external device 104, or an in-band sting received using a telemetry frequency of the connection between the medical device and the external device.

External device 104 may determine second information from a medical device (1304). For example, telemetry circuitry 308 of external device 104 may receive the second information from IMD 106. For example, processing circuitry 210 may be configured to determine the second information based on one or more of a sensor output from IMD 106, motion information generated by an accelerometer of sensing circuitry 204, posture information generated with an accelerometer of sensing circuitry 204, sleep information generated by sensing circuitry 204, an MRI signal generated by sensing circuitry 204, or a state of a connection between IMD 106 with external device 104 or another device of system 100.

External device 104 may determine out-of-band sting information associated with the medical device (1306). For example, external device 104 may determine whether an out-of-band sting has occurred, where an out-of-band sting may include one or more of detecting ultrasound by the medical device, detecting a telecoil induction device by the medical device, detecting a magnetic field (e.g., a Hall effect) by the medical device, detecting a vibration of external programmer by the medical device, detecting, by the medical device, or a tap on a body of a patient associated with the medical device External device 104 may determine a target connection time for a connection between the medical device and external device 104 based on one or more of first information detected by the external device, second information detected by the medical device, or the out-of-band sting information (1308). For example, external device 104 may determine an average frequency of access for a time of day (e.g., a user usage timeline map) and to select the connection parameters based on the average frequency of access for the time of day. In some examples, external device 104 may apply a machine learning module to one or more of the first information or the second information to determine the target connection time. For example, external device 104 may utilize supervised learning processes for classification techniques (e.g., support vector machine, neural networks, and/or k-nearest neighbor) or regression techniques (e.g., decision trees, linear models, and/or non-linear models). The machine learning module may be trained (e.g., by external device 104 or another device) using a set of training data, the set of training data being determined based on a respective time of day, respective first information, and respective second information for each user initiated connection of a set of previous user initiated connections.

External device 104 may establish, with the telemetry circuitry and at the target connection time, the connection between the medical device and the external device (1310) and may cause, using the connection, the medical device to deliver therapy to a patient associated with the medical device. For example, external device 104 may establish, with telemetry circuitry 308 and at the target connection time, the connection between IMD 106 and external device 104 and may cause, using the connection, IMD 106 to deliver therapy to patient 102.

Figure 14:
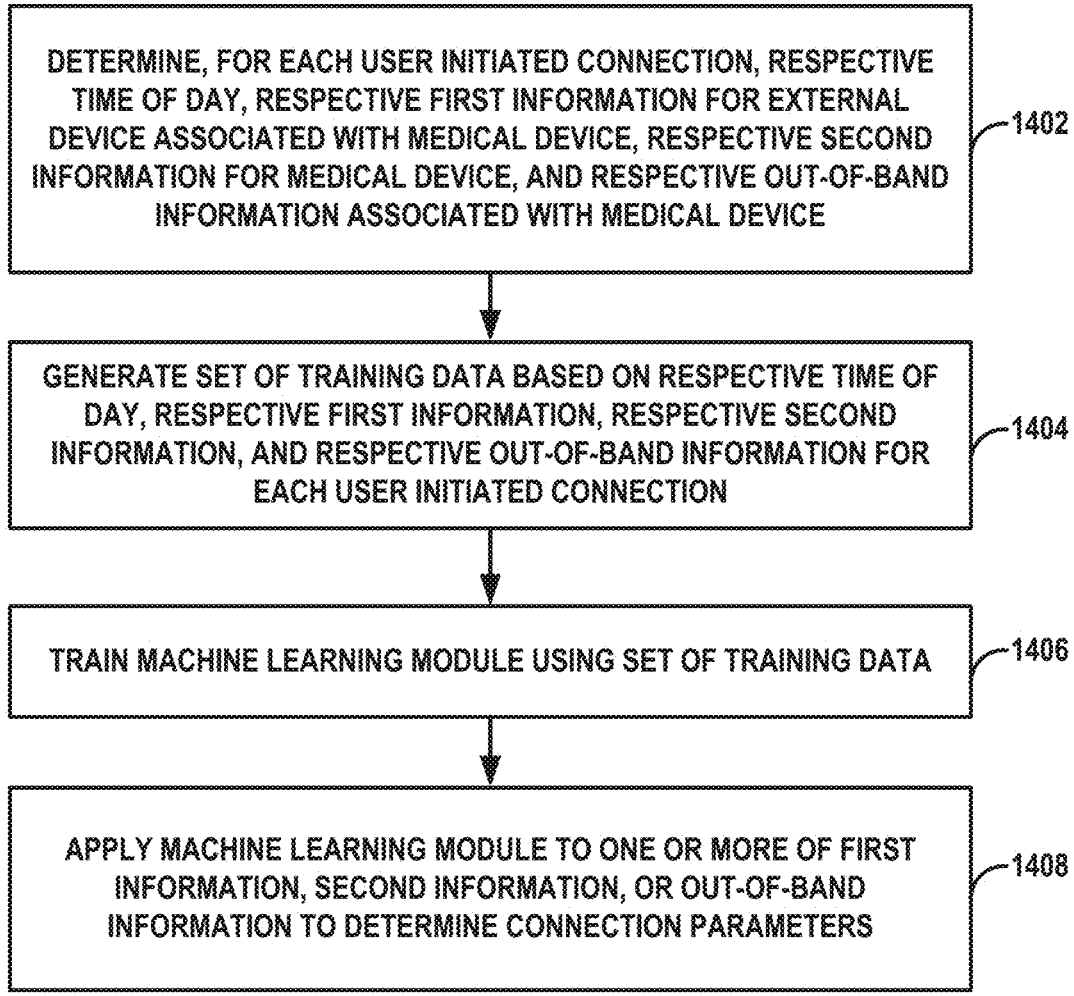
FIG. 14 is a flowchart illustrating an example operation for applying machine learning to determine connection parameters according to an example of the techniques of the disclosure.

FIG. 14 is a flowchart illustrating an example operation for applying machine learning to determine connection parameters according to an example of the techniques of the disclosure. FIG. 14 is discussed with FIGS. 1-10, 11A-11H, 12, 13 for example purposes only. External device 104 may determine, for each user initiated connection of the set of previous user interactions, the respective time of day, the respective first information for an external device associated with the medical device, and the respective second information for the medical device (1402). External device 104 may generate the set of training data based on the respective time of day and the respective first information, the respective second information for each user initiated connection (1404). External device 104 may train the machine learning module based on the set of training data (1406). IMD 106 may apply the machine learning module to one or more of first information, second information, or out-of-band information to determine connection parameters (1408).

Figure 15:
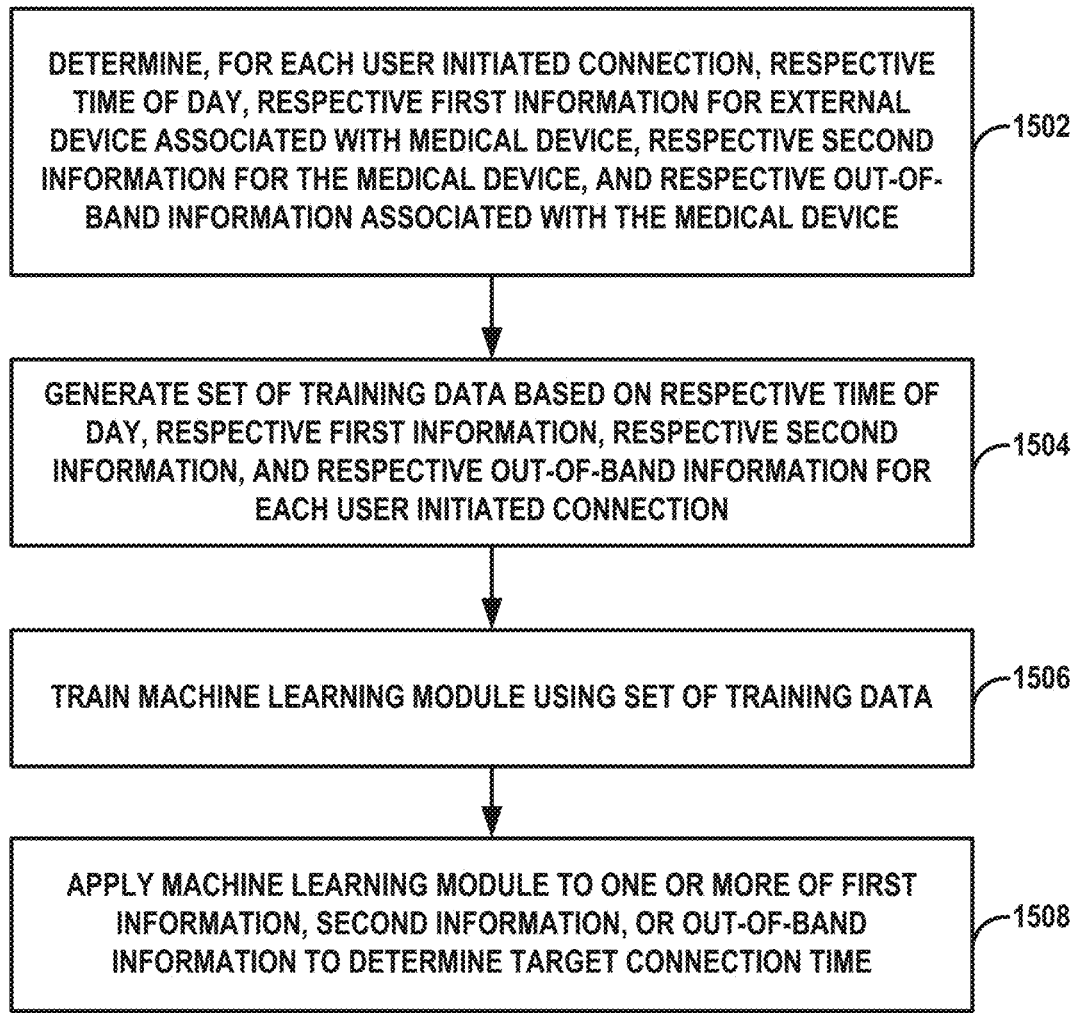
FIG. 15 is a flowchart illustrating an example operation for applying machine learning to preemptively establish a connection according to an example of the techniques of the disclosure.

FIG. 15 is a flowchart illustrating an example operation for applying machine learning to preemptively establish a connection according to an example of the techniques of the disclosure. FIG. 15 is discussed with FIGS. 1-10, 11A-11H, 12-14 for example purposes only. External device 104 may determine, for each user initiated connection of the set of previous user interactions, the respective time of day, the respective first information for an external device associated with the medical device, and the respective second information for the medical device (1502). External device 104 may generate the set of training data based on the respective time of day and the respective first information, the respective second information for each user initiated connection (1504). External device 104 may train the machine learning module based on the set of training data (1506). External device 104 may apply the machine learning module to one or more of first information, second information, or out-of-band information to determine a target connection time (1508).

Figure 16:
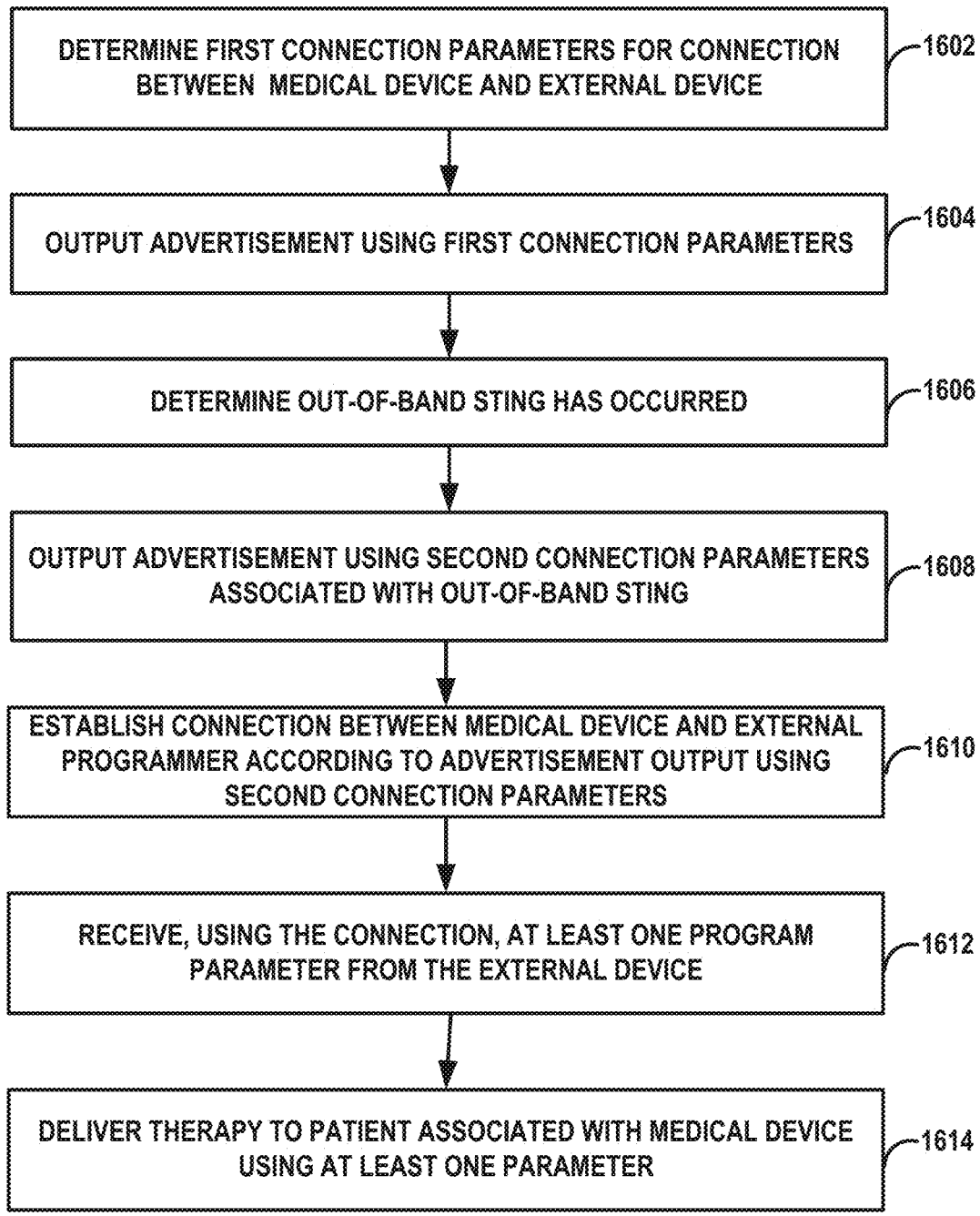
FIG. 16 is a flowchart illustrating an example operation for determining connection parameters in response to an out-of-band sting according to an example of the techniques of the disclosure.

FIG. 16 is a flowchart illustrating an example operation for determining connection parameters in response to an out-of-band sting according to an example of the techniques of the disclosure. FIG. 16 is discussed with FIGS. 1-10, 11A-11H, 12-15 for example purposes only. IMD 106 may determine first connection parameters for a connection between the medical device and the external device (1602). For example, IMD 106 may apply computational algorithm 706 to one or more of first information detected by external device 104, second information detected by the medical device, or out-of-band information to generate an advertising rate.

IMD 106 may output an advertisement for the connection using the first connection parameters (1604). For example, IMD 106 may output the advertisement according to an advertising rate specified in the first connection parameters. IMD 106 may determine an out-of-band sting has occurred (1606). For example, IMD 106 may detect an out-of-band sting including one or more of detecting ultrasound by the medical device, detecting a telecoil induction device by the medical device, detecting a magnetic field (e.g., a Hall effect) by the medical device, detecting a vibration of external programmer by the medical device, detecting, by the medical device, or a tap on a body of a patient associated with the medical device. While the example of FIG. 16 is directed to an out-of-band sting, some examples may use an in-band sting.

In response to the determination that the out-of-band sting has occurred, IMD 106 may output the advertisement using second connection parameters associated with the out-of-band sting (1608). For example, IMD 106 may output the advertisement according to an advertising rate specified in the second connection parameters. IMD 106 may establish the connection between the medical device and external programmer according to the advertisement using the second connection parameters (1610). For example, external device 104 may establish the connection using information (e.g., frequency hop information) specified in the advertisement. IMD 106 may receive, using the connection, at least one program parameter from external device 104 (1612) and deliver therapy to patient 102 using the at least one program parameter (1614).

Figure 17:
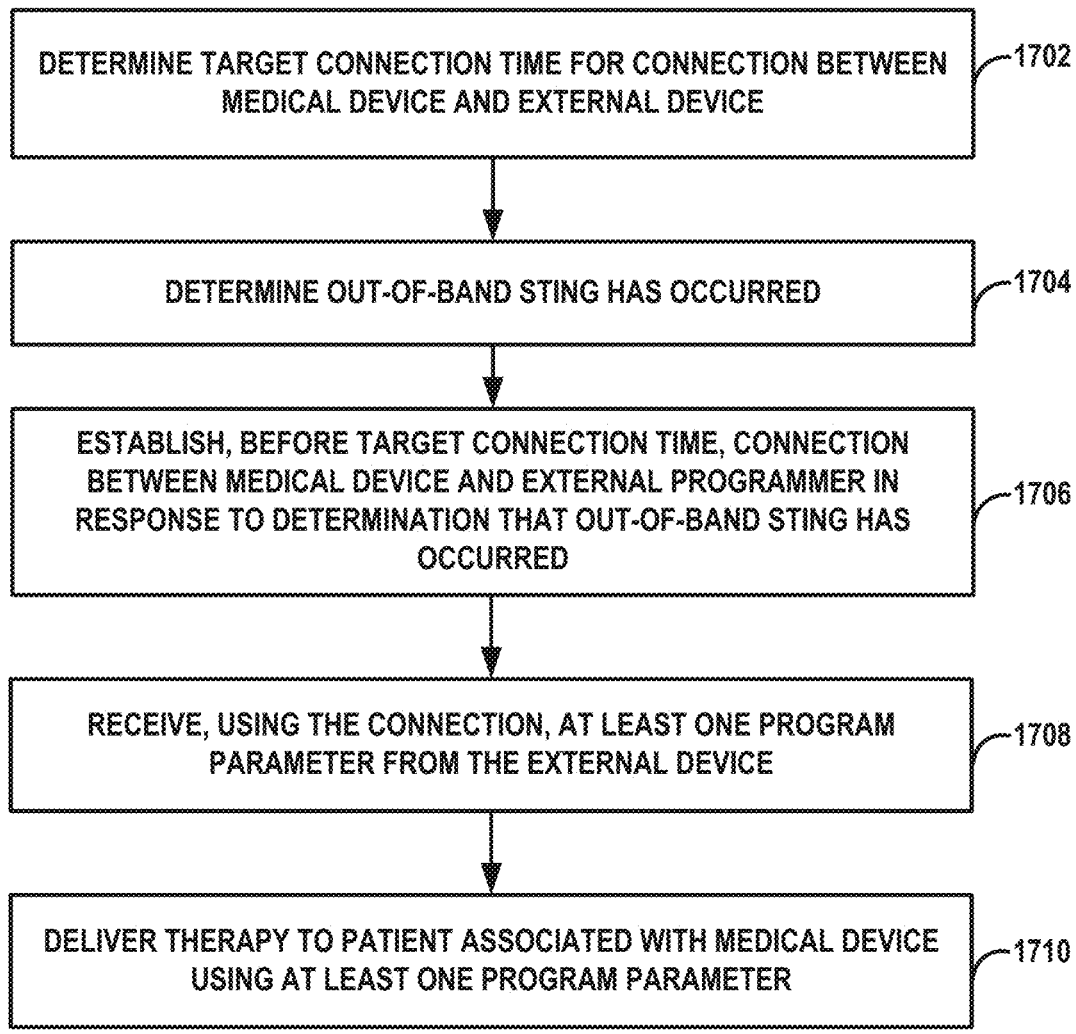
FIG. 17 is a flowchart illustrating an example operation for preemptively establishing a connection in response to an out-of-band sting according to an example of the techniques of the disclosure.

FIG. 17 is a flowchart illustrating an example operation for preemptively establishing a connection in response to an out-of-band sting according to an example of the techniques of the disclosure. FIG. 17 is discussed with FIGS. 1-10, 11A-11H, 12-16 for example purposes only. IMD 106 may determine a target connection time for a connection between the medical device and external device 104 (1702). For example, IMD 106 may apply computational algorithm 706 to one or more of first information detected by external device 104, second information detected by the medical device, or out-of-band information to determine the target connection time.

IMD 106 may determine an out-of-band sting has occurred (1704). For example, IMD 106 may detect an out-of-band sting including one or more of detecting ultrasound by the medical device, detecting a telecoil induction device by the medical device, detecting a magnetic field (e.g., a Hall effect) by the medical device, detecting a vibration of external programmer by the medical device, detecting, by the medical device, or a tap on a body of a patient associated with the medical device. In some examples, the out-of-band sting may "wakeup" telemetry circuitry 208 in response to a sting using ultrasound, or an inductive telemetry. While the example of FIG. 17 is directed to an out-of-band sting, some examples may use an in-band sting.

In response to the determination that the out-of-band sting has occurred, IMD 106 may establish, before the target connection time, the connection between the medical device and external programmer 106 in response to the determination that the out-of-band sting has occurred (1706). IMD 106 may receive, using the connection, at least one program parameter from external device 104 (1708) and deliver therapy to patient 102 using the at least one program parameter (1710).

The following clauses are a non-limiting list of examples in accordance with one or more techniques of this disclosure.

Clause 1: A system comprising: telemetry circuitry configured for communication between a medical device and an external device associated with the medical device; and processing circuitry configured to: determine an advertising interval of the medical device based on sensor information from the external device; and configure, with the telemetry circuitry, the medical device to advertise at the determined advertising interval.

Clause 2: The system of clause 1, wherein, to configure the medical device, the processing circuitry is further configured to: establish, with the telemetry circuitry, a first communication session between the medical device and the external device using an advertisement from the medical device; and output, during the first communication session and with the telemetry circuitry, an indication of the determined advertising interval to cause the medical device to communicate the advertisement at the determined advertising interval.

Clause 3: The system of clause 2, wherein the processing circuitry is further configured to: establish, with the telemetry circuitry, a second communication session between the medical device and the external device using an advertisement from the medical device; and output, using the second communication session and with the telemetry circuitry, an indication of information to cause the medical device to provide therapy using at least one program parameter.

Clause 4: The system of clauses 1-3, wherein the processing circuitry is configured to determine the sensor information based on a movement of the external device.

Clause 5: The system of claim 4, further comprising an accelerometer and/or a gyroscope configured to generate an indication of the movement of the external device.

Clause 6: The system of clauses 4-5, wherein, to determine the advertising interval, the processing circuitry is further configured to increase the advertising interval when the sensor information indicates a number of movements of the external device is less than a threshold.

Clause 7: The system of clauses 4-6, wherein, to determine the advertising interval, the processing circuitry is further configured to decrease the advertising interval when the sensor information indicates a number of movements of the external device is greater than a threshold.

Clause 8: The system of clauses 4-7, wherein the processing circuitry is configured to determine the advertising interval based on the movement of the external device and based further on a time of day.

Clause 9: The system of clause 8, wherein the processing circuitry is configured to: determine a period of time based on one or more previous communication sessions being established between the external device and the medical device; and determine the advertising interval based on the movement of the external device and based further on the time of day being within the period of time.

Clause 10: The system of clauses 4-9, wherein the processing circuitry is configured to determine the advertising interval based on the movement of the external device and based further on a motion of the medical device.

Clause 11: The system of clauses 4-8, wherein the processing circuitry is configured to determine the advertising interval based on the movement of the external device and based further on a position of the patient associated with the medical device.

Clause 12: The system of clauses 4-11, wherein the processing circuitry is configured to determine the advertising interval based on the movement of the external device and based further on whether the external device is configured in a do not disturb mode.

Clause 13: The system of clauses 4-12, wherein the processing circuitry is configured to determine the advertising interval based on the movement of the external device and based further on whether the external device has changed from a locked screen mode to an unlocked screen mode.

Clause 14: The system of clause 1-13, further comprising: a light sensor configured to detect a light level at the external device; and wherein the processing circuitry is configured to determine the sensor information based on the detected light level.

Clause 15: The system of clauses 1-14, further comprising: a microphone configured to detect a sound level at the external device; and wherein the processing circuitry is configured to determine the sensor information based on the detected sound level.

Clause 16: The system of clauses 1-13, wherein the advertising interval comprises a Bluetooth low energy advertising interval.

Clause 17: The system of clauses 1-14, wherein the external device comprises a mobile device.

Clause 18: The system of clauses 1-15, wherein the external device is configured to determine the advertising interval.

Clause 19: The system of clauses 1-16, wherein the medical device comprises an implantable medical device.

Clause 20: The system of clauses 1-19, wherein the telemetry circuitry and the processing circuitry are arranged in the external device.

Clause 21: The system of clauses 1-19, wherein the processing circuitry is arranged in the external device and the telemetry circuitry is arranged outside of the external device.

Clause 22: The system of clauses 1-21, wherein the determined advertising interval specifies a rate at which the medical device outputs the advertisement.

Clause 23: The system of clauses 1-22, wherein the medical device is configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS).

Clause 24: A method comprising: determining, by processing circuitry, an advertising interval for communication between an external device and a medical device associated with the external device based on sensor information from the external device; and configuring, by the processing circuitry and with telemetry circuitry, the medical device to advertise at the determined advertising interval.

Clause 25: A computer-readable storage medium having stored thereon instructions that, when executed, cause processing circuitry to: determine an advertising interval for communication between an external device and a medical device associated with the external device based on sensor information from the external device; and configure, with telemetry circuitry, the medical device to advertise at the determined advertising interval.

Clause 26: A system comprising: telemetry circuitry configured for communication between a medical device and an external device associated with the medical device; and processing circuitry configured to: determine that the external device is to initiate a communication session with the medical device based on sensor information from the external device; establish, with the telemetry circuitry, the communication session of the external device with the medical device in response to the determination to initiate the communication session with the medical device; receive, after establishing the communication session, an instruction to configure the medical device with at least one program parameter; and output, using the communication session, information to cause the medical device to provide therapy using the at least one program parameter.

Clause 27: The system of clause 26, wherein the processing circuitry is configured to determine the sensor information based on a movement of the external device.

Clause 28: The system of clause 27, further comprising an accelerometer configured to generate an indication of the movement of the external device.

Clause 29: The system of clauses 27-28, wherein the processing circuitry is configured to determine to initiate, with the telemetry circuitry, the communication session based on the movement of the external device and based further on a time of day.

Clause 30: The system of clause 29, wherein the processing circuitry is configured to: determine a period of time based on one or more previous communication sessions being established between the external device and the medical device; and determine to initiate, with the telemetry circuitry, the communication session based on the movement of the external device and based further on a time of day being within the period of time.

Clause 31: The system of clauses 27-30, wherein the processing circuitry is configured to determine to initiate, with the telemetry circuitry, the communication session based on the movement of the external device and based further on one or more of an acceleration of the medical device or a position of the patient associated with the medical device.

Clause 32: The system of clauses 26-31, further comprising: a light sensor configured to detect a light level at the external device; and wherein the processing circuitry is configured to determine the sensor information based on the detected light level.

Clause 33: The system of clauses 26-32, further comprising: a microphone configured to detect a sound level at the external device; and wherein the processing circuitry is configured to determine the sensor information based on the detected sound level.

Clause 34: The system of clauses 26-33, wherein the processing circuitry is configured to determine to initiate the communication session based further on whether the external device is configured in a do not disturb mode.

Clause 35: The system of clauses 26-34, wherein the processing circuitry is configured to determine to initiate the communication session based further on whether the external device has changed from a locked screen mode to an unlocked screen mode.

Clause 36: The system of clauses 26-35, wherein the external device is configured to determine to initiate the communication session.

Clause 37: The system of clauses 26-36, wherein the external device comprises a mobile device.

Clause 38: The system of clauses 26-37, wherein the medical device comprises an implantable medical device.

Clause 39: The system of clauses 26-38, wherein the telemetry circuitry and the processing circuitry are arranged in the external device.

Clause 40: The system of clauses 26-38, wherein the processing circuitry is arranged in the external device and the telemetry circuitry is arranged outside of the external device.

Clause 41: The system of clauses 26-40, further comprising the medical device.

Clause 42: The system of clauses 26-41, wherein the medical device is configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS).

Clause 43: A method comprising: determining, with processing circuitry, to that an external device is to initiate a communication session with a medical device based on sensor information from the external device associated with the medical device; establishing, with the processing circuitry, the communication session of the external device with the medical device in response to the determination to initiate the communication session with the medical device; receiving, with the processing circuitry, after establishing the communication session, an instruction to configure the medical device with at least one program parameter; and outputting, with the processing circuitry, using the communication session, information to cause the medical device to provide therapy using the at least one program parameter.

Clause 44: A computer-readable storage medium having stored thereon instructions that, when executed, cause processing circuitry to: determine that an external device is to initiate a communication session with a medical device based on sensor information from an external device associated with the medical device; establish the communication session of the external device with the medical device in response to the determination to initiate the communication session with the medical device; receive, after establishing the communication session, an instruction to configure the medical device with at least one program parameter; and output, using the communication session, information to cause the medical device to provide therapy using the at least one program parameter.

Clause 45: A system comprising: telemetry circuitry configured for communication between a medical device and an external device associated with the medical device; and processing circuitry configured to: determine connection parameters for a connection between the medical device and the external device based on one or more of first information detected by the external device or second information detected by the medical device; output an advertisement for the connection between the medical device and the external device based on the connection parameters; establish the connection between the medical device and the external device according to advertisement; receive, using the connection between the medical device and the external device, at least one program parameter from the external device; and deliver therapy to patient associated with medical device using the at least one program parameter.

Clause 46: The system of clause 45, wherein the telemetry circuitry is configured to receive the first information through one or more of a scan request, an advertisement previously output by the external device, or a previously established connection.

Clause 47: The system of any of clauses 45-46, wherein first information comprises one or more of: a first sensor signal from one or more of a microphone, a camera, an accelerometer, an optical sensor, a global positioning system (GPS), or a geo-fencing signal detected by the external device; a second sensor signal detected by a wearable device associated with the external device; application information from an application operating on the external device; a lock state signal indicating whether the external device is in an unlocked state or a locked state; a calendar event occurring at the external device; a remote request received by the external device; an establishment of a connection between the external device and an automobile; a user accessing an application associated with the medical device using the external device; or an in-band sting received using a telemetry frequency of the connection between the medical device and the external device.

Clause 48: The system of clauses 45-47, wherein the second information comprises one or more of: a sensor output detected by the medical device; motion information detected by the medical device; posture information and/or spatial information detected by the medical device; sleep information detected by the medical device; an adaptive usage module operating at the medical device and configured to select an advertising rate of the connection parameters based on historical information; a detection of a magnetic resonance imaging (MRI) signal by the medical device; or a state of a connection between the medical device with the external device or another device.

Clause 49: The system of clauses 45-48, wherein the processing circuitry is configured to determine the connection parameters for the connection between the medical device and the external device based further on out-of-band information associated with the medical device, wherein the out-of-band information comprises one or more of: non-telemetry frequency that is different from a frequency used for the connection between the medical device and the external device; or an out-of-band sting comprising one or more of detecting ultrasound by the medical device, detecting a telecoil induction device by the medical device, detecting a magnetic field by the medical device, detecting a vibration of external programmer by the medical device, detecting light by the medical device, detecting speech by the medical device, or a tap on a body of a patient associated with the medical device.

Clause 50: The system of clauses 45-49, wherein, to determine the connection parameters, the processing circuitry is further configured to determine an advertising rate for sending advertisements for establishing the connection.

Clause 51: The system of clauses 45-50, wherein, to determine the connection parameters, the processing circuitry is further configured to determine an average frequency of access for a time of day and to select the connection parameters based on the average frequency of access for the time of day.

Clause 52: The system of clause 51, wherein, to determine the average frequency of access, the processing circuitry is configured to generate a user usage timeline map.

Clause 53: The system of clauses 45-52, wherein, to determine the connection parameters, the processing circuitry is further configured to apply a machine learning module to one or more of the first information or the second information; and wherein the machine learning module has been trained using a set of training data, the set of training data being determined based on a respective time of day, respective first information, and respective second information for each user initiated connection of a set of previous user initiated connections.

Clause 54: The system of clause 53, wherein the external programmer is configured to: determine, for each user initiated connection of the set of previous user interactions, the respective time of day, the respective first information for an external device associated with the medical device, and the respective second information for the medical device; generate the set of training data based on the respective time of day and the respective first information, the respective second information for each user initiated connection; and train the machine learning module based on the set of training data.

Clause 55: The system of clauses 45-54, wherein the connection parameters comprises a Bluetooth low energy advertising interval.

Clause 56: The system of clauses 45-55, wherein the external device comprises a mobile device.

Clause 57: The system of clauses 45-56, wherein the medical device is configured to determine the connection parameters.

Clause 58: The system of clauses 45-57, wherein the medical device comprises an implantable medical device.

Clause 59: The system of clauses 45-58, wherein the telemetry circuitry and the processing circuitry are arranged in the medical device.

Clause 60: The system of clauses 45-59, wherein the medical device is configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS).

Clause 61: A method comprising a process of performing an operation of clauses 45-59.

Clause 62: A computer-readable storage medium having stored thereon instructions that, when executed, cause processing circuitry to perform the steps of clauses 45-59.

Clause 63: A system comprising: telemetry circuitry configured for communication between a medical device and an external device associated with the medical device; and processing circuitry configured to: determine a target connection time for a connection between the medical device and the external device based on one or more of first information detected by the external device or second information detected by the medical device; establish, with the telemetry circuitry and at the target connection time, the connection between the medical device and the external device; and cause, using the connection, the medical device to deliver therapy to a patient associated with the medical device.

Clause 64: The system of clause 63, wherein the first information comprises one or more of: a first sensor signal from one or more of a microphone, a camera, an accelerometer, an optical sensor, a global positioning system (GPS), or a geo-fencing signal detected by the external device; a second sensor signal detected by a wearable device associated with the external device; application information from an application operating on the external device; a lock state signal indicating whether the external device is in an unlocked state or a locked state; a calendar event occurring at the external device; a remote request received by the external device; an establishment of a connection between the external device and an automobile; a user accessing an application associated with the medical device using the external device; or an in-band sting received using a telemetry frequency of the connection between the medical device and the external device.

Clause 65: The system of clauses 63-64, wherein the second information comprises one or more of: a sensor output from the medical device; motion information detected by the medical device; posture information detected by the medical device; sleep information detected by the medical device; an adaptive usage module operating at the medical device configured to select the target connection time based on historical information; a detection of a magnetic resonance imaging (MRI) signal by the medical device; or a state of a connection between the medical device with the external device or another device.

Clause 66: The system of clauses 63-65, wherein the processing circuitry is configured to determine the connection parameters for the connection between the medical device and the external device based further on out-of-band information associated with the medical device, wherein the out-of-band information comprises one or more of: non-telemetry frequency that is different from a frequency used for the connection between the medical device and the external device; or an out-of-band sting comprising one or more of detecting ultrasound by the medical device, detecting a telecoil induction device by the medical device, detecting a Hall effect by the medical device, detecting a vibration of external programmer by the medical device, detecting, by the medical device, or a tap on a body of a patient associated with the medical device.

Clause 67: The system of clauses 63-66, wherein, to determine the target connection time, the processing circuitry is further configured to determine an average frequency of access for a time of day and to select the connection parameters based on the average frequency of access for the time of day.

Clause 68: The system of clause 67, wherein, to determine the average frequency of access, the processing circuitry is configured to generate a user usage timeline map.

Clause 69: The system of clauses 63-68, wherein, to determine the target connection time, the processing circuitry is further configured to apply a machine learning module to one or more of the first information or the second information; and wherein the machine learning module has been trained using a set of training data, the set of training data being determined based on a respective time of day, respective first information, and respective second information for each user initiated connection of.

Clause 70: The system of clause 69, wherein the processing circuitry is configured to: determine, for each user initiated connection of the set of previous user interactions, the respective time of day, the respective first information for an external device associated with the medical device, and the respective second information for the medical device; generate the set of training data based on the respective time of day and the respective first information, the respective second information for each user initiated connection; and train the machine learning module based on the set of training data.

Clause 71: The system of clauses 63-70, wherein the telemetry circuitry is configured to receive the second information from the medical device.

Clause 72: The system of clauses 63-71, wherein the external device comprises a mobile device.

Clause 73: The system of clauses 63-72, wherein the external device is configured to determine the target connection time.

Clause 74: The system of clauses 63-73, wherein the medical device comprises an implantable medical device.

Clause 75: The system of clauses 63-74, wherein the telemetry circuitry and the processing circuitry are arranged in the external device.

Clause 76: The system of clauses 63-74, wherein the processing circuitry is arranged in the external device and the telemetry circuitry is arranged outside of the external device.

Clause 77: The system of clauses 63-76, further comprising the medical device.

Clause 78: The system of clauses 63-77, wherein the medical device is configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS).

Clause 79: A method comprising a process of performing an operation of clauses 63-78.

Clause 80: A computer-readable storage medium having stored thereon instructions that, when executed, cause processing circuitry to perform the steps of clauses 63-78.

Clause 81: A system comprising: telemetry circuitry configured for communication between a medical device and an external device associated with the medical device; and processing circuitry configured to: output an advertisement for a connection between the medical device and the external device using first connection parameters; determine a sting has occurred; in response to the determination that the sting has occurred, output the advertisement using second connection parameters associated with the sting; and establish the connection between the medical device and the external device according to the advertisement output using second connection parameters.

Clause 82: The system of clause 81, wherein the second connection parameters comprise one or more of: non-telemetry frequency that is different from a frequency used for the connection between the medical device and the external device; or the sting comprises an out-of-band sting comprising one or more of detecting ultrasound by the medical device, detecting a telecoil induction device by the medical device, detecting a Hall effect by the medical device, detecting a vibration of external programmer by the medical device, detecting, by the medical device, or a tap on a body of a patient associated with the medical device.

Clause 83: The system of clauses 81-82, wherein the processing circuitry is further configured to: determine the first connection parameters to comprise a first advertising rate; and determine the second connection parameters to comprise a second advertising rate that is different from the first advertising rate.

Clause 84: The system of clause 83, wherein the second advertising rate is greater than the first advertising rate.

Clause 85: The system of clauses 81-84, wherein the telemetry circuitry is configured to receive the first connection parameters from the external device.

Clause 86: The system of clauses 81-85, wherein the first connection parameters comprises a first Bluetooth low energy advertising interval and wherein the second connection parameters comprises a second Bluetooth low energy advertising interval different form the first Bluetooth low energy advertising interval.

Clause 87: The system of clauses 81-86, wherein the external device comprises a mobile device.

Clause 88: The system of clauses 81-87, wherein the medical device is configured to determine the first connection parameters.

Clause 89: The system of clauses 81-88, wherein the external device is configured to determine the first connection parameters.

Clause 90: The system of clauses 81-89, wherein the medical device comprises an implantable medical device.

Clause 91: The system of clauses 81-90, wherein the telemetry circuitry and the processing circuitry are arranged in the medical device.

Clause 92: The system of clauses 81-90, wherein the processing circuitry is arranged in the medical device and the telemetry circuitry is arranged outside of the medical device.

Clause 93: The system of clauses 81-92, further comprising the external device.

Clause 94: The system of clauses 81-93, wherein the medical device is configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS).

Clause 95: A method comprising a process of performing an operation of clauses 81-94.

Clause 96: A computer-readable storage medium having stored thereon instructions that, when executed, cause processing circuitry to perform the steps of clauses 81-94.

Clause 97: A system comprising: telemetry circuitry configured for communication between a medical device and an external device associated with the medical device; and processing circuitry configured to: determine a target connection time for a connection between the medical device and the external device based on first connection parameters; determine a sting has occurred; and in response to the determination that the sting has occurred and before the target connection time, establish the connection between the medical device and the external device.

Clause 98: The system of clause 97, wherein the sting comprises an out-of-band sting comprising one or more of detecting ultrasound by the medical device, detecting a telecoil induction device by the medical device, detecting a Hall effect by the medical device, detecting a vibration of external programmer by the medical device, detecting, by the medical device, or a tap on a body of a patient associated with the medical device.

Clause 99: The system of clauses 97-98, wherein the telemetry circuitry is configured to receive an indication of the target connection time from the external device and wherein the processing circuitry is configured to determine the target connection time based on the indication of the target connection time received from the external device.

Clause 100: The system of clauses 97-99, wherein the telemetry circuitry is configured to receive first information from the external device and wherein the processing circuitry is configured to determine the target connection time based on the first information received from the external device.

Clause 101: The system of clause 100, wherein the first information comprises one or more of: a first sensor signal from one or more of a microphone, a camera, an accelerometer, an optical sensor, a global positioning system (GPS), or a geo-fencing signal detected by the external device; a second sensor signal detected by a wearable device associated with the external device; application information from an application operating on the external device; a lock state signal indicating whether the external device is in an unlocked state or a locked state; a calendar event occurring at the external device; a remote request received by the external device; an establishment of a connection between the external device and an automobile; a user accessing an application associated with the medical device using the external device; or an in-band sting received using a telemetry frequency of the connection between the medical device and the external device.

Clause 102: The system of clauses 97-101, wherein the external device comprises a mobile device.

Clause 103: The system of clauses 97-102, wherein the medical device comprises an implantable medical device.

Clause 104: The system of clauses 97-103, wherein the telemetry circuitry and the processing circuitry are arranged in the medical device.

Clause 105: The system of clauses 97-103, wherein the processing circuitry is arranged in the medical device and the telemetry circuitry is arranged outside of the medical device.

Clause 106: The system of clauses 97-105, further comprising the external device.

Clause 107: The system of clauses 97-106, wherein the medical device is configured to provide one or more of deep brain stimulation (DBS), spinal cord stimulation (SCS), sacral neuromodulation (SNS), targeted drug delivery (TDD), pelvic stimulation, gastric stimulation, or peripheral nerve field stimulation (PNFS).

Clause 108: A method comprising a process of performing an operation of clauses 97-107.

Clause 109: A computer-readable storage medium having stored thereon instructions that, when executed, cause processing circuitry to perform the steps of clauses 97-107.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A system comprising:
   telemetry circuitry configured for communication between a medical device and an external device associated with the medical device; and
   processing circuitry configured to:
      determine an advertising interval of the medical device based on sensor information comprising sensed data received from the external device; and
      configure the medical device to advertise, with the telemetry circuitry, at the determined advertising interval.

2. The system of claim 1, wherein, to configure the medical device, the processing circuitry is further configured to:
   establish, with the telemetry circuitry, a first communication session between the medical device and the external device using an advertisement from the medical device; and
   output, during the first communication session and with the telemetry circuitry, an indication of the determined advertising interval to cause the medical device to communicate the advertisement at the determined advertising interval.

3. The system of claim 2, wherein the processing circuitry is further configured to:
   establish, with the telemetry circuitry, a second communication session between the medical device and the external device using an advertisement from the medical device; and
   output, using the second communication session and with the telemetry circuitry, an indication of information to cause the medical device to provide therapy using at least one program parameter.

4. The system of claim 1, wherein the processing circuitry is configured to determine the sensor information comprising the sensed data received from the external device based on a movement of the external device.

5. The system of claim 4, further comprising an accelerometer and/or a gyroscope configured to generate an indication of the movement of the external device.

6. The system of claim 4, wherein, to determine the advertising interval, the processing circuitry is further configured to increase the advertising interval when the sensor information indicates a number of movements of the external device is less than a threshold.

7. The system of claim 4, wherein, to determine the advertising interval, the processing circuitry is further configured to decrease the advertising interval when the sensor information indicates a number of movements of the external device is greater than a threshold.

8. The system of claim 4, wherein the processing circuitry is configured to determine the advertising interval based on the movement of the external device and based further on a time of day.

9. The system of claim 8, wherein the processing circuitry is configured to:
   determine a period of time based on one or more previous communication sessions being established between the external device and the medical device; and
   determine the advertising interval based on the movement of the external device and based further on the time of day being within the period of time.

10. The system of claim 4, wherein the processing circuitry is configured to determine the advertising interval based on the movement of the external device and based further on a motion of the medical device.

11. The system of claim 4, wherein the processing circuitry is configured to determine the advertising interval based on the movement of the external device and based further on a position of a patient associated with the medical device.

12. The system of claim 4, wherein the processing circuitry is configured to determine the advertising interval based on the movement of the external device and based further on whether the external device is configured in a do not disturb mode.

13. The system of claim 4, wherein the processing circuitry is configured to determine the advertising interval based on the movement of the external device and based further on whether the external device has changed from a locked screen mode to an unlocked screen mode.

14. The system of claim 1, further comprising:
   a light sensor configured to detect a light level at the external device,
   wherein the sensed data comprises data indicative of the detected light level.

15. The system of claim 1, further comprising:
   a microphone configured to detect a sound level at the external device,
   wherein the sensed data comprises data indicative of the detected sound level.

16. The system of claim 1, wherein the advertising interval comprises a Bluetooth low energy advertising interval.

17. The system of claim 1, wherein the external device comprises a mobile device.

18. The system of claim 1, wherein the external device is configured to determine the advertising interval.

19. A method comprising:
- determining, by processing circuitry, an advertising interval for communication between an external device and a medical device associated with the external device based on sensor information comprising sensed data received from the external device; and
- configuring, by the processing circuitry, the medical device to advertise, with telemetry circuitry configured for communication between the external device and the medical device, at the determined advertising interval.

20. A non-transitory computer-readable storage medium having stored thereon instructions that, when executed, cause processing circuitry to:
- determine an advertising interval for communication between an external device and a medical device associated with the external device based on sensor information comprising sensed data received from the external device; and
- configure the medical device to advertise, with telemetry circuitry configured for communication between the external device and the medical device, at the determined advertising interval.

* * * * *